United States Patent
Noh et al.

(10) Patent No.: US 11,728,949 B2
(45) Date of Patent: *Aug. 15, 2023

(54) CONTROL INFORMATION FOR MULTI-USER TRANSMISSIONS IN WLAN SYSTEMS

(71) Applicant: ATLAS GLOBAL TECHNOLOGIES LLC, Austin, TX (US)

(72) Inventors: Yujin Noh, Irvine, CA (US); Daewon Lee, Irvine, CA (US); Sungho Moon, Irvine, CA (US); Young Hoon Kwon, Laguna Niguel, CA (US)

(73) Assignee: Atlas Global Technologies LLC, Austin, TX (US)

( * ) Notice: Subject to any disclaimer, the term of this patent is extended or adjusted under 35 U.S.C. 154(b) by 26 days.

This patent is subject to a terminal disclaimer.

(21) Appl. No.: 17/183,239

(22) Filed: Feb. 23, 2021

(65) Prior Publication Data

US 2021/0176026 A1 Jun. 10, 2021

Related U.S. Application Data

(63) Continuation of application No. 16/449,245, filed on Jun. 21, 2019, now Pat. No. 10,965,425, which is a (Continued)

(51) Int. Cl.
*H04L 5/00* (2006.01)
*H04W 84/12* (2009.01)

(52) U.S. Cl.
CPC .......... *H04L 5/0053* (2013.01); *H04L 5/0007* (2013.01); *H04L 5/0037* (2013.01); *H04L 5/0094* (2013.01); *H04W 84/12* (2013.01)

(58) Field of Classification Search
None
See application file for complete search history.

(56) References Cited

U.S. PATENT DOCUMENTS 9,917,670 B1 3/2018 Zhang
9,930,692 B2 * 3/2018 Li .................. H04W 74/004
(Continued)

FOREIGN PATENT DOCUMENTS

CA 274735 10/2020
CN 1871792 11/2006
(Continued)

OTHER PUBLICATIONS

Azizi et al., "OFDMA Numerology and Structure," IEEE 802.11-15/0330r1, Mar. 2015, retrieved from https://www.google.com/url?url=https://mentor.iee.org/802.11/dcn/15/11-15-0330-01-00ax-ofdma-numerology-and-structure.pptx*rct-j&frm-1&q-&esrc-s&sa-U&ved-0ahUKEwjk07iW9L_ PAhBeyYKHZipAfMQFggcMAE&usg=AFQjCNFxYH9UmaRKy_gvhs63Zcap17MzqA].
(Continued)

*Primary Examiner* — Steve R Young
(74) *Attorney, Agent, or Firm* — Thomas J. Lavan

(57) ABSTRACT

In wireless communications for multi-users, an access point may generate a first frame for allocating resources to a plurality of stations. The first frame may contain an indication as to whether a station(s) is allocated at least one of a set of resource units (RUs) of a plurality of RUs, such as a center 26-tone RU. The set of resource units may be based on a channel bandwidth of the wireless communications. The indication may be contained in a common block field of signal fields, such as a common block field of high efficiency (HE) signal content channel(s) of an HE signal field. The station(s) may receive the first frame and determine whether the one of the set of RUs is allocated. The station(s) may transmit a second frame to the access point based on resource allocation information in the first frame. Other methods, apparatus, and computer-readable media are also disclosed.

20 Claims, 32 Drawing Sheets

Related U.S. Application Data continuation of application No. 15/231,638, filed on Aug. 8, 2016, now Pat. No. 10,348,471.

(60) Provisional application No. 62/347,021, filed on Jun. 7, 2016, provisional application No. 62/234,567, filed on Sep. 29, 2015, provisional application No. 62/202,756, filed on Aug. 7, 2015, provisional application No. 62/202,758, filed on Aug. 7, 2015.

(56) References Cited

U.S. PATENT DOCUMENTS

| | | | |
|---|---|---|---|
| 9,955,469 | B2 | 4/2018 | Li |
| 10,057,924 | B2 | 8/2018 | Li |
| 10,084,635 | B2 | 9/2018 | Chen |
| 10,219,271 | B1 | 2/2019 | Hedayat |
| 10,341,999 | B2 | 7/2019 | Bharadwaj |
| 10,602,501 | B2 | 3/2020 | Li |
| 2015/0009894 | A1 | 1/2015 | Vermani et al. |
| 2015/0163028 | A1 | 6/2015 | Tandra et al. |
| 2015/0365923 | A1* | 12/2015 | Vermani ............ H04L 27/0008 370/329 |
| 2016/0080043 | A1 | 3/2016 | Tian |
| 2016/0156438 | A1* | 6/2016 | Sun ................ H04L 5/0007 370/330 |
| 2016/0204912 | A1 | 7/2016 | Sun |
| 2016/0255610 | A1 | 9/2016 | Li |
| 2016/0329999 | A1* | 11/2016 | Li ................ H04L 5/0053 |
| 2016/0330715 | A1 | 11/2016 | Chen |
| 2016/0353323 | A1 | 12/2016 | Sun |
| 2016/0353414 | A1 | 12/2016 | Choi |
| 2017/0013092 | A1 | 1/2017 | Chen |
| 2017/0026969 | A1 | 1/2017 | Rong |
| 2017/0295561 | A1 | 10/2017 | Kim |
| 2018/0132109 | A1* | 5/2018 | Lim ............... H04L 27/2602 |

FOREIGN PATENT DOCUMENTS

| | | |
|---|---|---|
| CN | 101414876 | 4/2009 |
| CN | 102484522 | 5/2012 |
| EP | 3293932 A1 | 3/2018 |

OTHER PUBLICATIONS

LAN/MAN Standards Committee of the IEEE Computer Society, "IEEE P802.11ah™/D5.0 Draft Standard for Information Technology—Telecommunications and information exchange between systems Local and metropolitan area networks—Specific requirements, Part 11: Wireles LAN Medium Access Control (MAC) and Physical Layer (PHY) Specifications, Amendment 2: Sub 1 GHz License Exempt Operation," Mar. 2015.

LAN/MAN Standards Committee of the IEEE Computer Society, "IEEE Standard for Information Technology—Telecommunications and information exchange between systems Local and metropolitan area networks—Specific requirements, Part 11: Wireless LAN Medium Access Control (MAC) and Physical Layer (PHY) Specifications," 2012.

LAN/MAN Standards Committee of the IEEE Computer Society, "IEEE Standards for Information Technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

Chinese Office Action from Chinese Patent Application No. 201680046537.9, dated Dec. 30, 2019, 12 pages.

European Office Action from European Patent Application No. 16835765.5, dated Oct. 30, 2020, 8 pages.

European Office Action from European Patent Application No. 16835765.5, dated Apr. 3, 2020, 7 pages.

Extended European Search Report from European Patent Application No. 16835765.5, dated Feb. 21, 2019, 10 pages.

Indian Office Action from Indian Patent Application No. 201817003431, dated Sep. 1, 2020, 5 pages.

International Search Report and Written Opinion dated Oct. 26, 2016, which issued in International Application No. PCT/US16/46067.

* cited by examiner

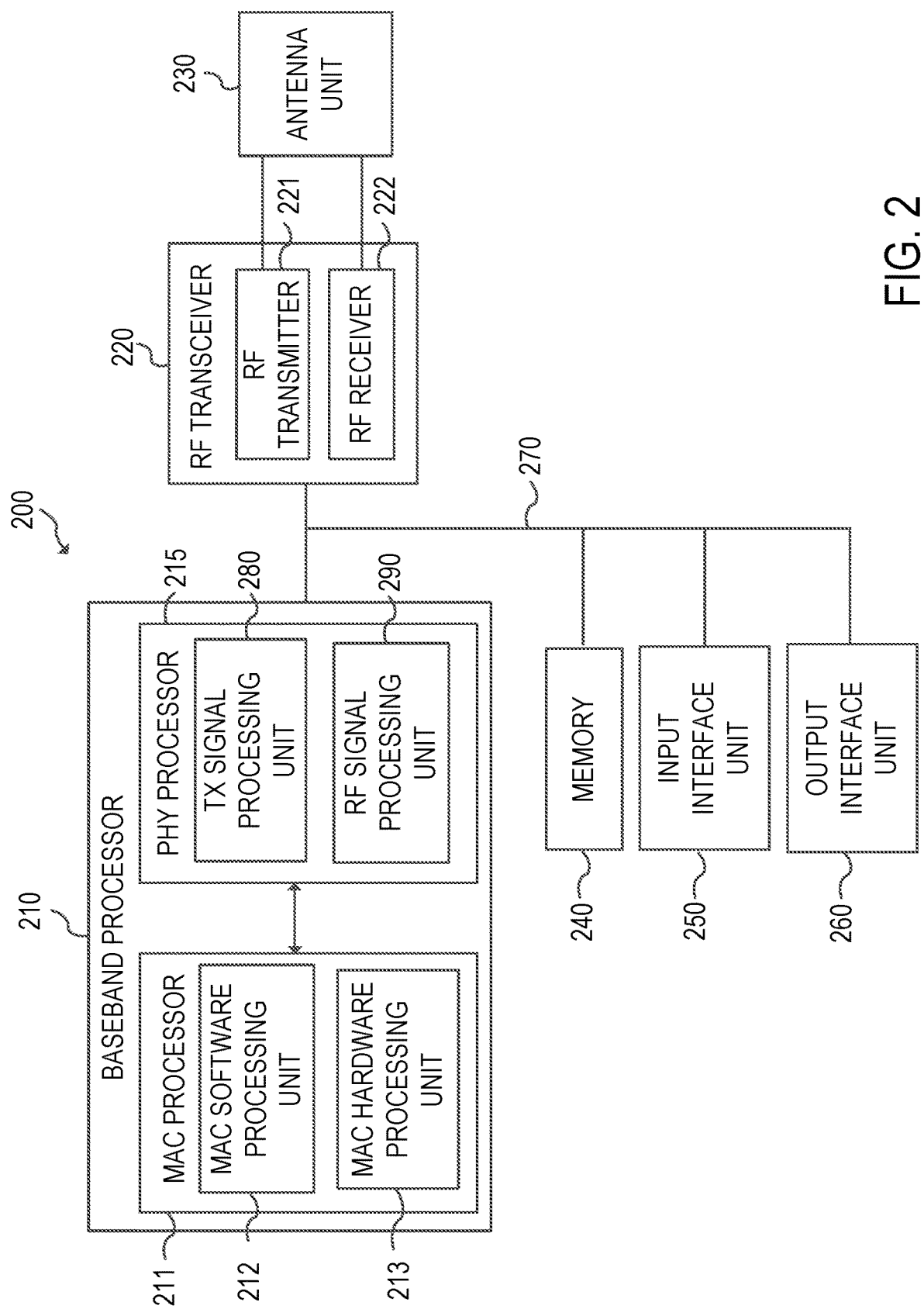

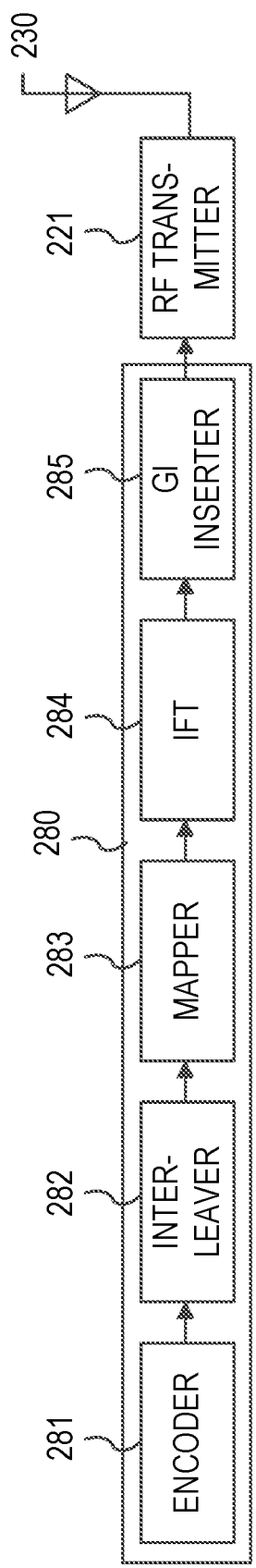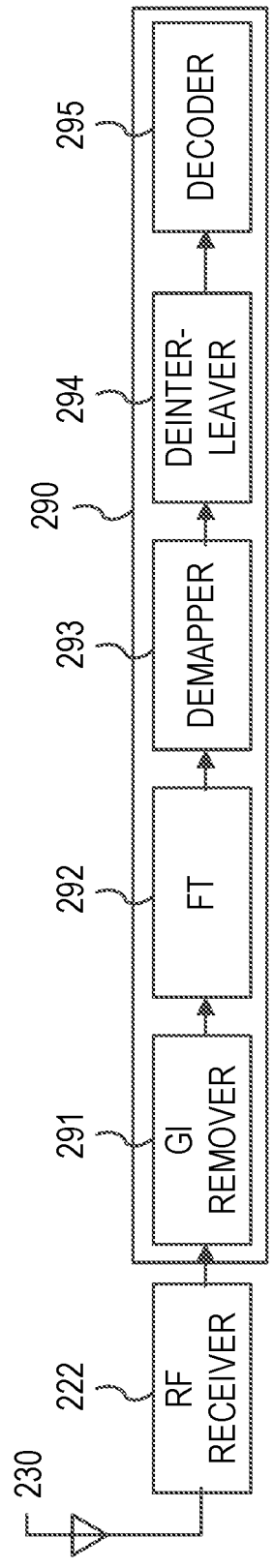

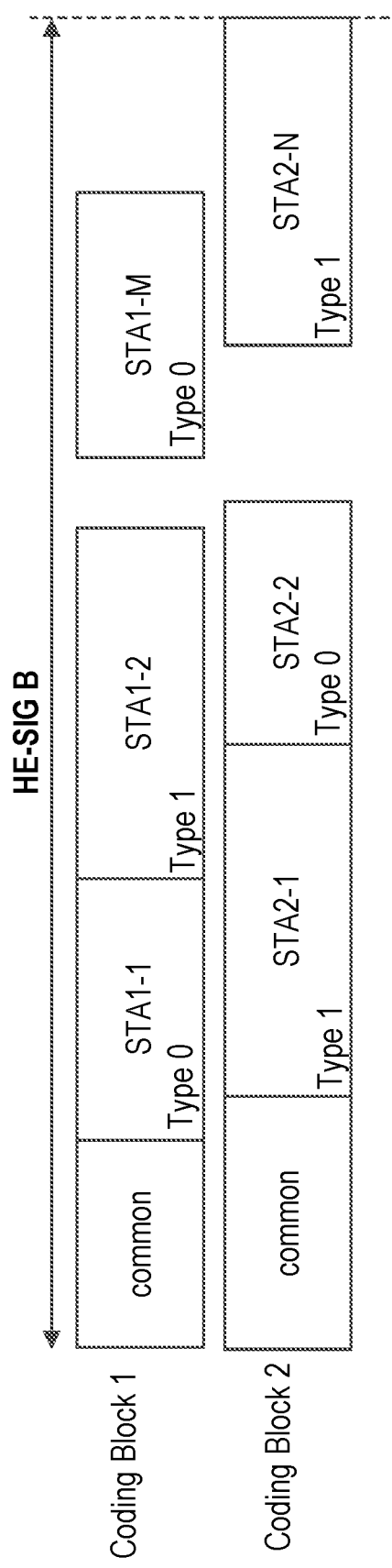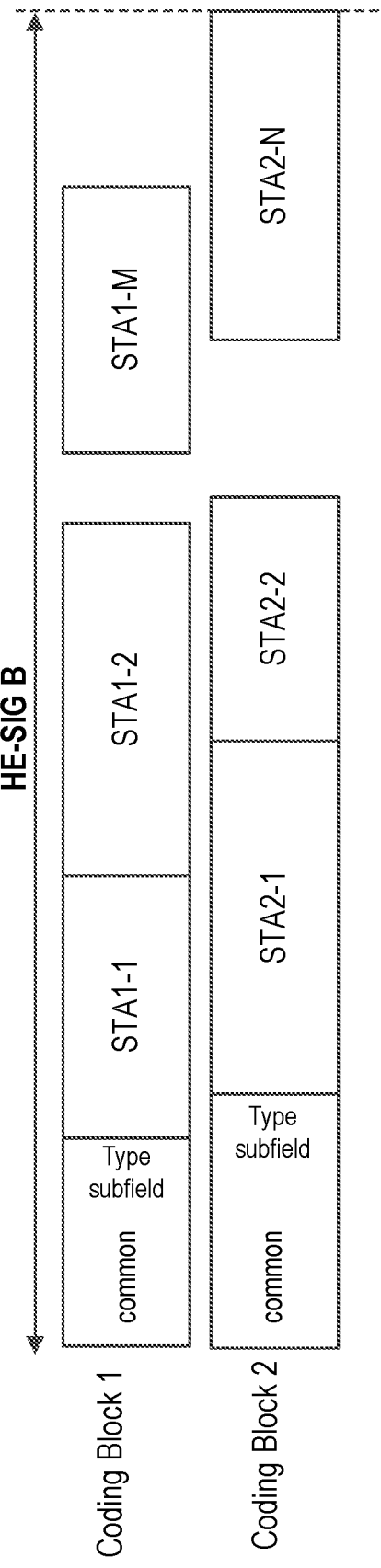
FIG. 12
FIG. 13

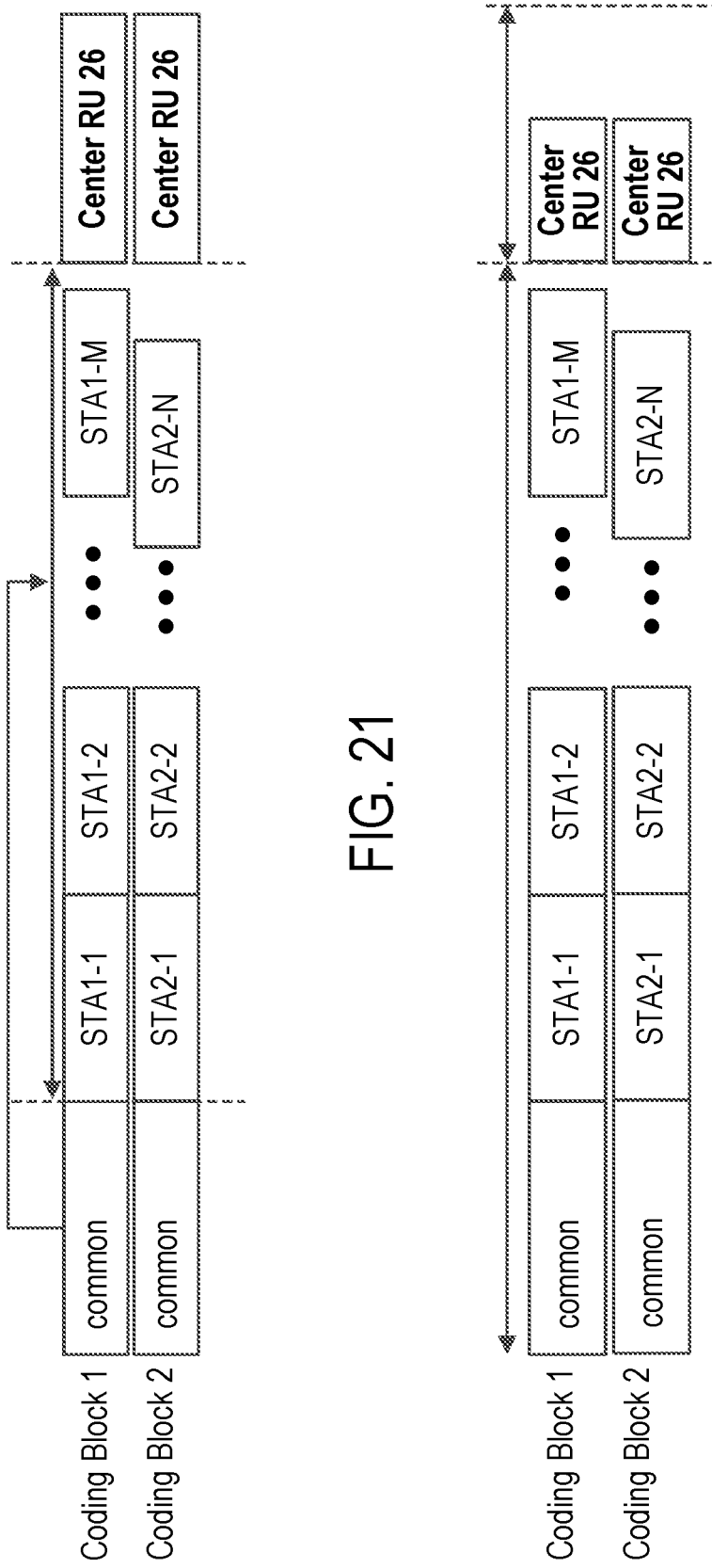

CONTROL INFORMATION FOR MULTI-USER TRANSMISSIONS IN WLAN SYSTEMS

CROSS-REFERENCE TO RELATED APPLICATIONS

This application is a continuation of application Ser. No. 16/449,245, filed on Jun. 21, 2019, which is a continuation of application Ser. No. 15/231,638, filed on Aug. 8, 2016, now U.S. Pat. No. 10,348,471, which claims the benefit of U.S. Provisional Application No. 62/202,756, filed on Aug. 7, 2015; U.S. Provisional Application No. 62/202,758, filed on Aug. 7, 2015; U.S. Provisional Application No. 62/234,567, filed on Sep. 29, 2015; and U.S. Provisional Application No. 62/347,021, filed on Jun. 7, 2016, the entirety of each of which is incorporated herein by reference.

TECHNICAL FIELD

The present description relates in general to wireless communication systems and methods, and more particularly to, for example, without limitation, control information for multi-user transmissions in wireless local area network (WLAN) systems.

BACKGROUND

Wireless local area network (WLAN) devices are deployed in diverse environments. These environments are generally characterized by the existence of access points and non-access point stations. Increased interference from neighboring devices gives rise to performance degradation. Additionally, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

The description provided in the background section should not be assumed to be prior art merely because it is mentioned in or associated with the background section. The background section may include information that describes one or more aspects of the subject technology.

BRIEF DESCRIPTION OF THE DRAWINGS

FIG. 2 illustrates a schematic diagram of an example of a wireless communication device.

FIG. 3A illustrates a schematic block diagram of an example of a transmitting signal processor in a wireless communication device.

FIG. 3B illustrates a schematic block diagram of an example of a receiving signal processor in a wireless communication device.

FIGS. 12 and 13 illustrate examples of an HE-SIG-B field.

FIG. 21 illustrates an example of an HE-SIG-B field in which the special 26 resource unit is mapped to a different OFDM symbol.

FIG. 22 illustrates an example of an HE-SIG-B field in which the special 26 resource unit is mapped to a compressed OFDM symbol.

Figure 1:
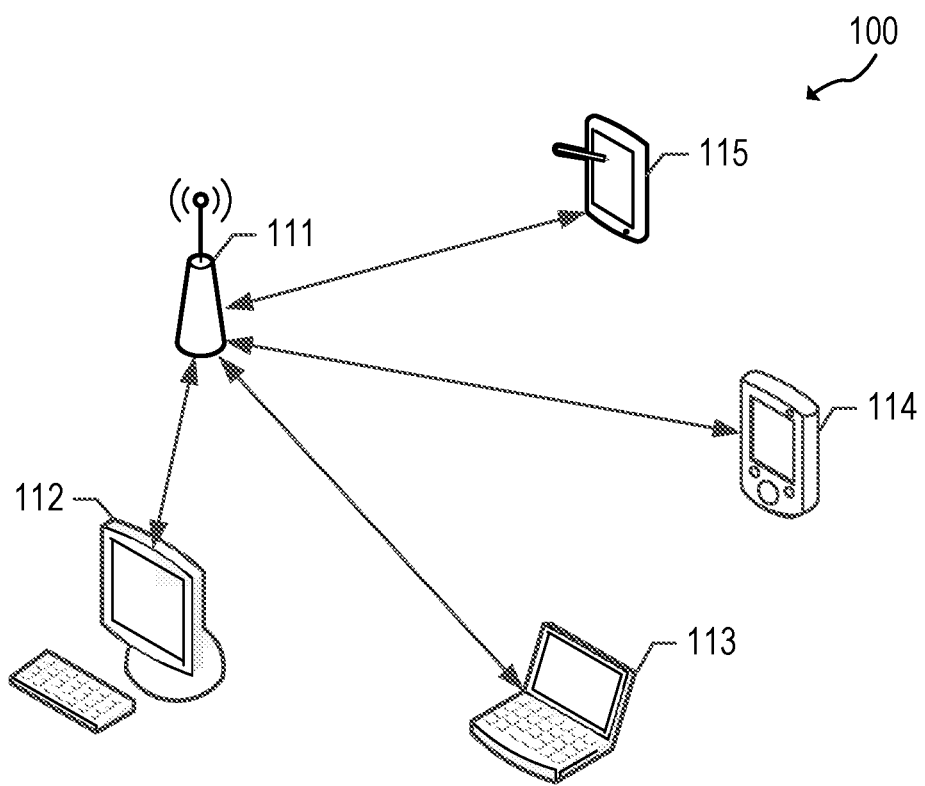
FIG. 1 illustrates a schematic diagram of an example of a wireless communication network.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The Institute of Electrical and Electronics Engineers (IEEE) 802.11, Task Group ax, provides a new generation of wireless local area network (WLAN). In an aspect, IEEE 802.11ax may be referred to as high efficiency (HE) WLAN (HEW) or simply HE. In one or more implementations, the subject technology may be utilized in IEEE systems, such as HEW-based systems. Several technologies and structures are provided in the IEEE 802.11ax to facilitate wireless communication. In an aspect, such technologies and/or structures may allow support of reasonable outdoor performance.

The IEEE 802.11ax introduces the use of orthogonal frequency division multiple access (OFDMA) in WLAN. In an aspect, OFDMA can improve the physical layer (PHY) efficiency in cases with user frequency multiplexing gain. In OFDMA, resource units (RUs) form building blocks that may be assigned to stations (STAs) for communication with an access point (AP). In an aspect, the AP includes a scheduler that can assign one or more resource units to each station participating in the OFDMA-based communication. An amount of control information (e.g., provided by the AP to STA, and/or vice versa) may be different depending on the types of technologies/structures applicable to the resource units assigned for each STA. In one or more implementations, the subject technology provides an HE signal B (e.g., HE-SIG-B) encoding structure. In an aspect, HE-SIG-B may be referred to as HE-SIG-B field, SIG-B, SIG-B field, or variant thereof. In an aspect, a station may be referred to as a user.

In an aspect, a subfield may be utilized to indicate a type of station specific information in a type subfield. The subfield may provide information that may be utilized to help determine the size (e.g., number of symbols) of each STA specific information for assigned STAs and an entire length of HE-SIG-B field. In an aspect, the type subfield may help support different combination of subfields depending on STA type (e.g., single-user (SU) type, multi-user (MU) type, etc.).

In some cases, duplicated orthogonal frequency division multiplexing (OFDM) symbol in the time domain may be utilized to extend a range of a legacy signal (L-SIG) in an HE preamble. In one or more aspects, in order to extend the range of a data portion (e.g., high efficiency data), RU repetition in the frequency domain may be helpful for the same purpose as extending the range of the L-SIG. For instance, without payload available for outdoor circumstance, the large range (e.g., extended range) of the L-SIG (e.g., due to the duplication) in the preamble may be meaningless.

In an aspect, duplicated resource unit(s) in the frequency domain in OFDMA may be helpful in allowing robust communication for outdoor circumstances. The duplicated RUs, which may be contiguous or non-contiguous RUs, may be repeated and assigned for STAs in OFDMA. For instance, data information for a STA is mapped to an RU and repeated (e.g., in the frequency domain) in one or more other RUs.

FIG. 1 illustrates a schematic diagram of an example of a wireless communication network 100. In the wireless communication network 100, such as a wireless local area network (WLAN), a basic service set (BSS) includes a plurality of wireless communication devices (e.g., WLAN devices). In one aspect, a BSS refers to a set of STAs that can communicate in synchronization, rather than a concept indicating a particular area. In the example, the wireless communication network 100 includes wireless communication devices 111-115, which may be referred to as stations (STAs).

Each of the wireless communication devices 111-115 may include a media access control (MAC) layer and a physical (PHY) layer according to an IEEE 802.11 standard. In the example, at least one wireless communication device (e.g., device 111) is an access point (AP). An AP may be referred to as an AP STA, an AP device, or a central station. The other wireless communication devices (e.g., devices 112-115) may be non-AP STAs. Alternatively, all of the wireless communication devices 111-115 may be non-AP STAs in an Ad-hoc networking environment.

An AP STA and a non-AP STA may be collectively called STAs. However, for simplicity of description, in some aspects, only a non-AP STA may be referred to as a STA. An AP may be, for example, a centralized controller, a base station (BS), a node-B, a base transceiver system (BTS), a site controller, a network adapter, a network interface card (NIC), a router, or the like. A non-AP STA (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium, for an associated STA. For example, an AP may provide access to the internet for one or more STAs that are wirelessly and communicatively connected to the AP. In FIG. 1, wireless communications between non-AP STAs are made by way of an AP. However, when a direct link is established between non-AP STAs, the STAs can communicate directly with each other (without using an AP).

In one or more implementations, OFDMA-based 802.11 technologies are utilized, and for the sake of brevity, a STA refers to a non-AP high efficiency (HE) STA, and an AP refers to an HE AP. In one or more aspects, a STA may act as an AP.

FIG. 2 illustrates a schematic diagram of an example of a wireless communication device. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of, any of the wireless communication devices 111-115.

In the example, the baseband processor 210 performs baseband signal processing, and includes a medium access control (MAC) processor 211 and a PHY processor 215. The memory 240 may store software (such as MAC software)

including at least some functions of the MAC layer. The memory may further store an operating system and applications.

In the illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation. The PHY processor 215 includes a transmitting (TX) signal processing unit 280 and a receiving (RX) signal processing unit 290. The term TX may refer to transmitting, transmit, transmitted, transmitter or the like. The term RX may refer to receiving, receive, received, receiver or the like.

The PHY processor 215 interfaces to the MAC processor 211 through, among others, transmit vector (TXVECTOR) and receive vector (RXVECTOR) parameters. In one or more aspects, the MAC processor 211 generates and provides TXVECTOR parameters to the PHY processor 215 to supply per-packet transmit parameters. In one or more aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215 and/or other components of the wireless communication device 200.

In one or more implementations, the wireless communication device 200 includes a permanent storage device (not shown) configured as a read-and-write memory device. The permanent storage device may be a non-volatile memory unit that stores instructions even when the wireless communication device 200 is off. The ROM, registers and the permanent storage device may be part of the baseband processor 210 or be a part of the memory 240. Each of the ROM, the permanent storage device, and the memory 240 may be an example of a memory or a computer-readable medium. A memory may be one or more memories.

The memory 240 may be a read-and-write memory, a read-only memory, a volatile memory, a non-volatile memory, or a combination of some or all of the foregoing. The memory 240 may store instructions that one or more of the MAC processor 211, the PHY processor 215, and/or another component may need at runtime.

The RF transceiver 220 includes an RF transmitter 221 and an RF receiver 222. The input interface unit 250 receives information from a user, and the output interface unit 260 outputs information to the user. The antenna unit 230 includes one or more antennas. When multi-input multi-output (MIMO) or multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In one or more implementations, the bus 270 communicatively connects the baseband processor 210 with the memory 240. From the memory 240, the baseband processor 210 may retrieve instructions to execute and data to process in order to execute the processes of the subject disclosure. The baseband processor 210 can be a single processor, multiple processors, or a multi-core processor in different implementations. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device, e.g., printers and display devices or any other device for outputting information. One or more implementations may include devices that function as both input and output devices, such as a touchscreen.

One or more implementations can be realized in part or in whole using a computer-readable medium. In one aspect, a computer-readable medium includes one or more media. In one or more aspects, a computer-readable medium is a tangible computer-readable medium, a computer-readable storage medium, a non-transitory computer-readable medium, a machine-readable medium, a memory, or some combination of the foregoing (e.g., a tangible computer-readable storage medium, or a non-transitory machine-readable storage medium). In one aspect, a computer is a machine. In one aspect, a computer-implemented method is a machine-implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM, PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors (e.g., 210, 211, 212, 213, 215, 280, 290) to perform one or more operations or a method. Instructions may include, for example, programs, routines, subroutines, data, data structures, objects, sequences, commands, operations, modules, applications, and/or functions. Those skilled in the art would recognize how to implement the instructions.

A processor (e.g., 210, 211, 212, 213, 215, 280, 290) may be coupled to one or more memories (e.g., one or more external memories such as the memory 240, one or more memories internal to the processor, one or more registers internal or external to the processor, or one or more remote memories outside of the device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 211, 212, 213, 215, 280, 290) is configured to cause one or more operations of the subject disclosure to occur. In one aspect, a processor is configured to cause an apparatus (e.g., a wireless communication device 200) to perform operations or a method of the subject disclosure. In one or more implementations, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 211, 212, 213, 215, 280, 290), the one or more processors cause one or more operations of the subject disclosure to occur or cause an apparatus (e.g., a wireless communication device 200) to perform operations or a method of the subject disclosure.

FIG. 3A illustrates a schematic block diagram of an example of a transmitting signal processing unit 280 in a wireless communication device. The transmitting signal processing unit 280 of the PHY processor 215 includes an encoder 281, an interleaver 282, a mapper 283, an inverse Fourier transformer (IFT) 284, and a guard interval (GI) inserter 285.

The encoder 281 encodes input data. For example, the encoder 281 may be a forward error correction (FEC) encoder. The FEC encoder may include a binary convolutional code (BCC) encoder followed by a puncturing device, or may include a low-density parity-check (LDPC) encoder. The interleaver 282 interleaves the bits of each stream output from the encoder 281 to change the order of bits. In one aspect, interleaving may be applied only when BCC encoding is employed. The mapper 283 maps the sequence of bits output from the interleaver 282 into constellation points.

When MIMO or MU-MIMO is employed, the transmitting signal processing unit 280 may use multiple instances of the interleaver 282 and multiple instances of the mapper 283 corresponding to the number of spatial streams ($N_{SS}$). In the example, the transmitting signal processing unit 280 may further include a stream parser for dividing outputs of the BCC encoders or the LDPC encoder into blocks that are sent to different interleavers 282 or mappers 283. The transmitting signal processing unit 280 may further include a space-time block code (STBC) encoder for spreading the constellation points from the number of spatial streams into a number of space-time streams ($N_{STS}$) and a spatial mapper for mapping the space-time streams to transmit chains. The spatial mapper may use direct mapping, spatial expansion, or beamforming depending on implementation. When MU-MIMO is employed, one or more of the blocks before reaching the spatial mapper may be provided for each user.

The IFT 284 converts a block of the constellation points output from the mapper 283 or the spatial mapper into a time domain block (e.g., a symbol) by using an inverse discrete Fourier transform (IDFT) or an inverse fast Fourier transform (IFFT). If the STBC encoder and the spatial mapper are employed, the IFT 284 may be provided for each transmit chain.

When MIMO or MU-MIMO is employed, the transmitting signal processing unit 280 may insert cyclic shift diversities (CSDs) to prevent unintentional beamforming. The CSD insertion may occur before or after the inverse Fourier transform operation. The CSD may be specified per transmit chain or may be specified per space-time stream. Alternatively, the CSD may be applied as a part of the spatial mapper.

The GI inserter 285 prepends a GI to the symbol. The transmitting signal processing unit 280 may optionally perform windowing to smooth edges of each symbol after inserting the GI. The RF transmitter 221 converts the symbols into an RF signal and transmits the RF signal via the antenna unit 230. When MIMO or MU-MIMO is employed, the GI inserter 285 and the RF transmitter 221 may be provided for each transmit chain.

FIG. 3B illustrates a schematic block diagram of an example of a receiving signal processing unit 290 in a wireless communication device. The receiving signal processing unit 290 of the PHY processor 215 includes a GI remover 291, a Fourier transformer (FT) 292, a demapper 293, a deinterleaver 294, and a decoder 295.

The RF receiver 222 receives an RF signal via the antenna unit 230 and converts the RF signal into one or more symbols. In some aspects, the GI remover 291 removes the GI from the symbol. When MIMO or MU-MIMO is employed, the RF receiver 222 and the GI remover 291 may be provided for each receive chain.

The FT 292 converts the symbol (e.g., the time domain block) into a block of the constellation points by using a discrete Fourier transform (DFT) or a fast Fourier transform (FFT) depending on implementation. In one or more implementations, the FT 292 is provided for each receive chain.

When MIMO or MU-MIMO is employed, the receiving signal processing unit 290 may further include a spatial demapper for converting the Fourier transformed receiver chains to constellation points of the space-time streams, and a STBC decoder (not shown) for despreading the constellation points from the space-time streams into the spatial streams.

The demapper 293 demaps the constellation points output from the FT 292 or the STBC decoder to the bit streams. If the LDPC encoding is used, the demapper 293 may further perform LDPC tone demapping before the constellation demapping. The deinterleaver 294 deinterleaves the bits of each stream output from the demapper 293. In one or more implementations, deinterleaving may be applied only when BCC decoding is used.

When MIMO or MU-MIMO is employed, the receiving signal processing unit 290 may use multiple instances on the demapper 293 and multiple instances of the deinterleaver 294 corresponding to the number of spatial streams. In the example, the receiving signal processing unit 290 may further include a stream deparser for combining the streams output from the deinterleavers 294.

The decoder 295 decodes the streams output from the deinterleaver 294 and/or the stream deparser. For example, the decoder 295 may be an FEC decoder. The FEC decoder may include a BCC decoder or an LDPC decoder.

Figure 4:
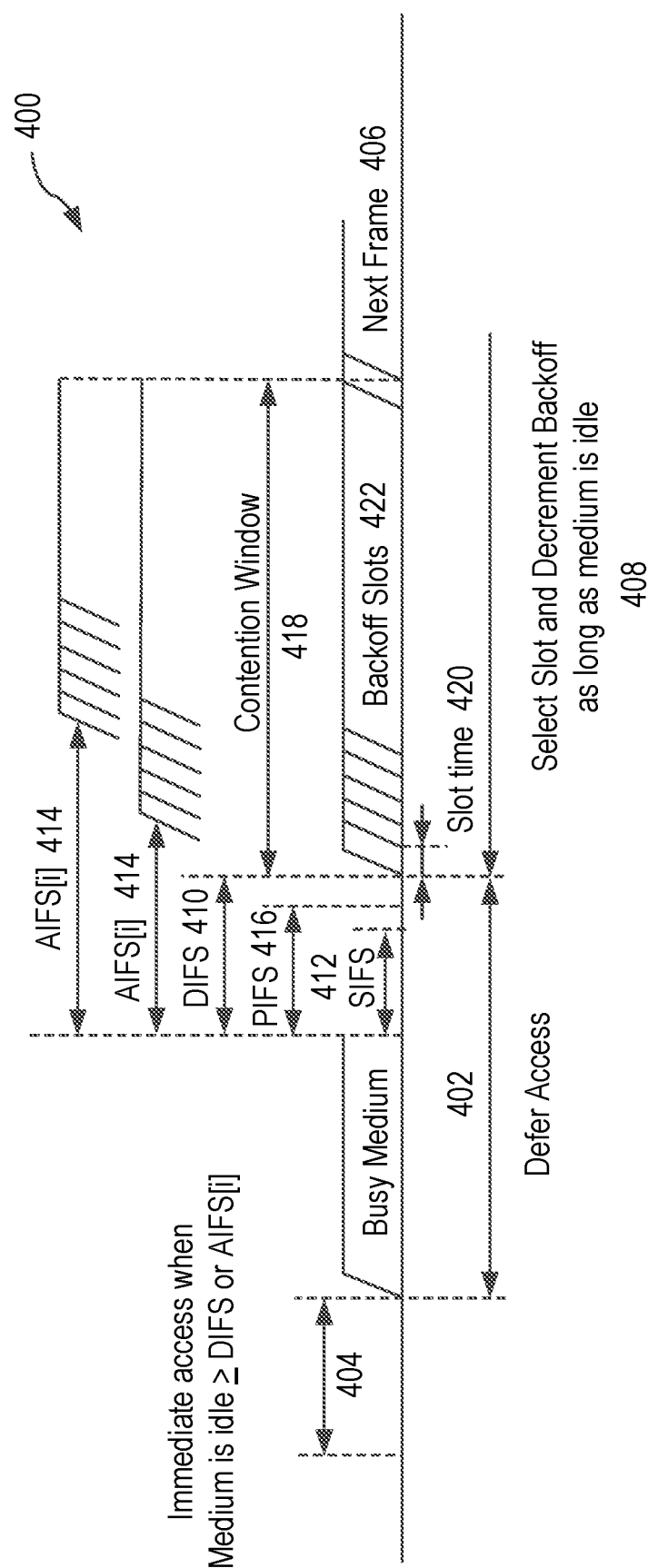
FIG. 4 illustrates an example of a timing diagram of interframe space (IFS) relationships.

FIG. 4 illustrates an example of a timing diagram of interframe space (IFS) relationships. In this example, a data frame, a control frame, or a management frame can be exchanged between the wireless communication devices 111-115 and/or other WLAN devices.

Referring to the timing diagram 400, during the time interval 402, access is deferred while the medium (e.g., a wireless communication channel) is busy until a type of IFS duration has elapsed. At time interval 404, immediate access is granted when the medium is idle for a duration that is equal to or greater than a distributed coordination function IFS (DIFS) 410 duration or arbitration IFS (AIFS) 414 duration. In turn, a next frame 406 may be transmitted after a type of IFS duration and a contention window 418 have passed. During the time 408, if a DIFS has elapsed since the medium has been idle, a designated slot time 420 is selected and one or more backoff slots 422 are decremented as long as the medium is idle.

The data frame is used for transmission of data forwarded to a higher layer. In one or more implementations, a WLAN device transmits the data frame after performing backoff if DIFS 410 has elapsed from a time when the medium has been idle.

The management frame is used for exchanging management information that is not forwarded to the higher layer. Subtype frames of the management frame include a beacon frame, an association request/response frame, a probe request/response frame, and an authentication request/response frame.

The control frame is used for controlling access to the medium. Subtype frames of the control frame include a request to send (RTS) frame, a clear to send (CTS) frame, and an ACK frame. In the case that the control frame is not a response frame of the other frame (e.g., a previous frame), the WLAN device transmits the control frame after performing backoff if the DIFS 410 has elapsed. In the case that the control frame is the response frame of the other frame, the WLAN device transmits the control frame without performing backoff if a short IFS (SIFS) 412 has elapsed. For example, the SIFS may be 16 microseconds. The type and subtype of frame may be identified by a type field and a subtype field in a frame control field of the frame.

On the other hand, a Quality of Service (QoS) STA may transmit the frame after performing backoff if AIFS 414 for access category (AC), e.g., AIFS[AC], has elapsed. In this case, the data frame, the management frame, or the control frame that is not the response frame may use the AIFS[AC].

In one or more implementations, a point coordination function (PCF) enabled AP STA transmits the frame after performing backoff if a PCF IFS (PIFS) 416 has elapsed. In this example, the PIFS 416 duration is less than the DIFS 410 but greater than the SIFS 412. In some aspects, the PIFS 416 is determined by incrementing the SIFS 412 duration by a designated slot time 420.

Figure 5:
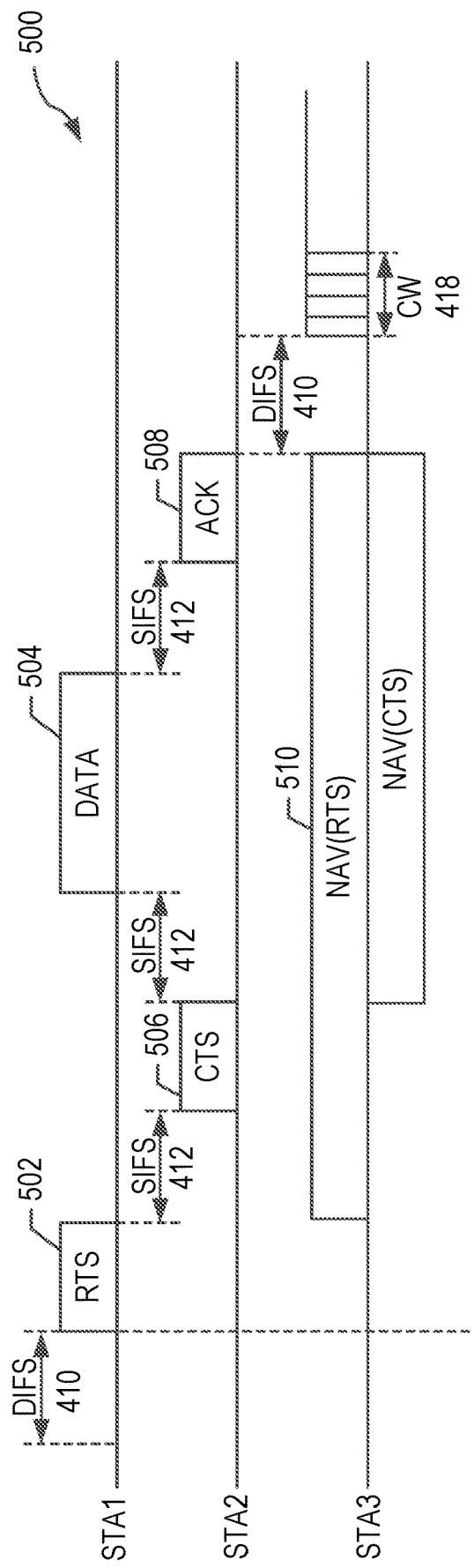
FIG. 5 illustrates an example of a timing diagram of a carrier sense multiple access/collision avoidance (CSMA/CA) based frame transmission procedure for avoiding collision between frames in a channel.

FIG. 5 illustrates an example of a timing diagram of a carrier sense multiple access/collision avoidance (CSMA/CA) based frame transmission procedure for avoiding collision between frames in a channel. In FIG. 5, any one of the wireless communication devices 111-115 in FIG. 1 can be designated as one of STA1, STA2 or STA3. In this example, the wireless communication device 111 is designated as STA1, the wireless communication device 112 is designated as STA2, and the wireless communication device 113 is designated as STA3. While the timing of the wireless communication devices 114 and 115 is not shown in FIG. 5, the timing of the devices 114 and 115 may be the same as that of STA2.

In this example, STA1 is a transmit WLAN device for transmitting data, STA2 is a receive WLAN device for receiving the data, and STA3 is a WLAN device that may be located at an area where a frame transmitted from the STA1 and/or a frame transmitted from the STA2 can be received by the STA3.

The STA1 may determine whether the channel (or medium) is busy by carrier sensing. The STA1 may determine the channel occupation based on an energy level on the channel or correlation of signals in the channel. In one or more implementations, the STA1 determines the channel occupation by using a network allocation vector (NAV) timer.

When determining that the channel is not used by other devices during the DIFS 410 (e.g., the channel is idle), the STA1 may transmit an RTS frame 502 to the STA2 after performing backoff Upon receiving the RTS frame 502, the STA2 may transmit a CTS frame 506 as a response of the CTS frame 506 after the SIFS 412.

When the STA3 receives the RTS frame 502, the STA3 may set a NAV timer for a transmission duration representing the propagation delay of subsequently transmitted frames by using duration information involved with the transmission of the RTS frame 502 (e.g., NAV(RTS) 510). For example, the STA3 may set the transmission duration expressed as the summation of a first instance of the SIFS 412, the CTS frame 506 duration, a second instance of the SIFS 412, a data frame 504 duration, a third instance of the SIFS 412 and an ACK frame 508 duration.

Upon receiving a new frame (not shown) before the NAV timer expires, the STA3 may update the NAV timer by using duration information included in the new frame. The STA3 does not attempt to access the channel until the NAV timer expires.

When the STA1 receives the CTS frame 506 from the STA2, the STA1 may transmit the data frame 504 to the STA2 after the SIFS 412 elapses from a time when the CTS frame 506 has been completely received. Upon successfully receiving the data frame 504, the STA2 may transmit the ACK frame 508 after the SIFS 412 elapses as an acknowledgment of receiving the data frame 504.

When the NAV timer expires, the STA3 may determine whether the channel is busy by the carrier sensing. Upon determining that the channel is not used by the other WLAN devices (e.g., STA1, STA2) during the DIFS 410 after the NAV timer has expired, the STA3 may attempt the channel access after a contention window 418 has elapsed. In this example, the contention window 418 may be based on a random backoff.

Figure 6:
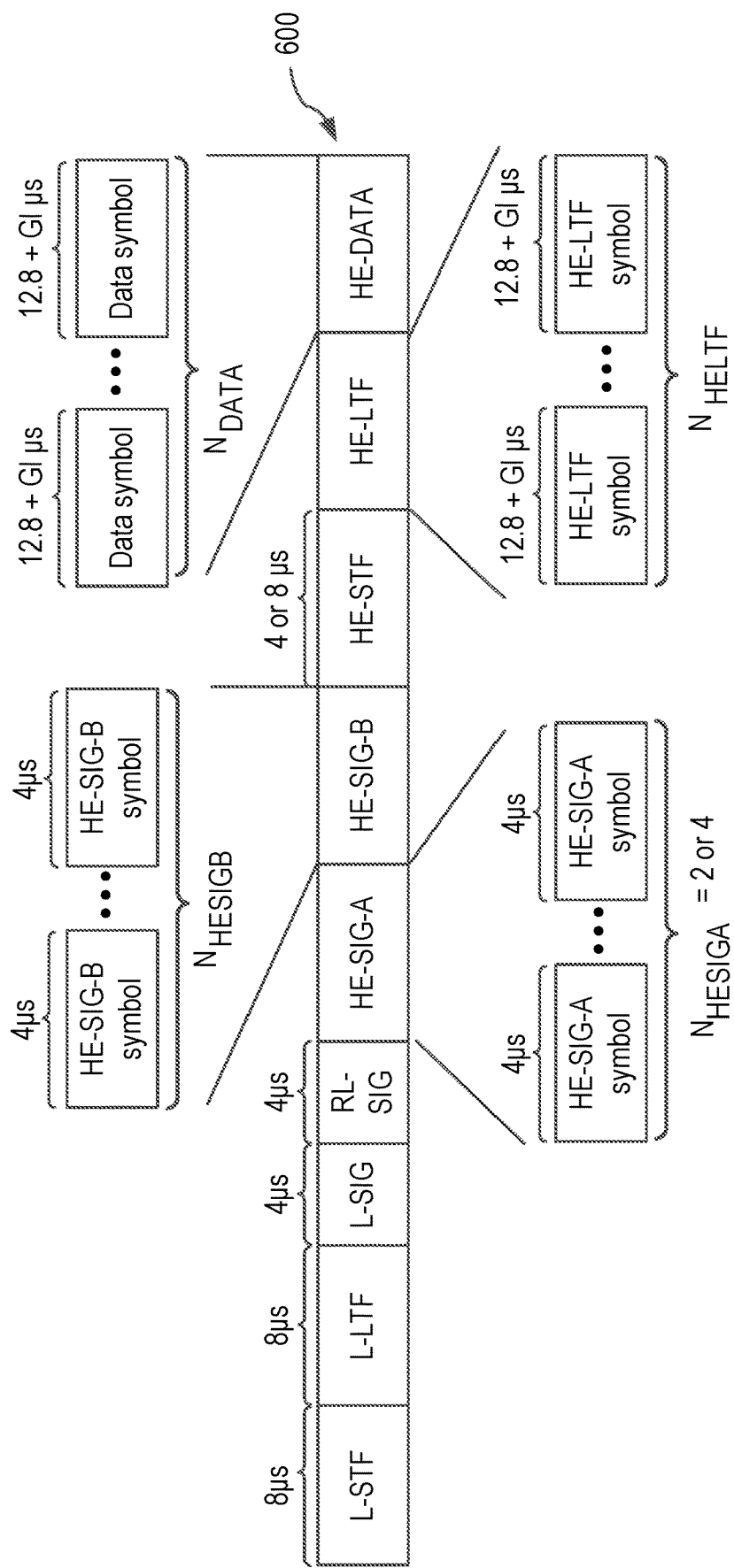
FIG. 6 illustrates an example of a high efficiency (HE) frame.

FIG. 6 illustrates an example of a high efficiency (HE) frame 600. The HE frame 600 is a physical layer convergence procedure (PLCP) protocol data unit (or PPDU) format. An HE frame may be referred to as an OFDMA frame, a PPDU, a PPDU format, an OFDMA PPDU, an MU PPDU, another similar term, or vice versa. An HE frame may be simply referred to as a frame for convenience. A transmitting station (e.g., AP, non-AP station) may generate the HE frame 600 and transmit the HE frame 600 to a receiving station. The receiving station may receive, detect, and process the HE frame 600. The HE frame 600 may include an L-STF field, an L-LTF field, an L-SIG field, an RL-SIG field, an HE-SIG-A field, an HE-SIG-B field, an HE-STF field, an HE-LTF field, and an HE-DATA field. The HE-SIG-A field may include $N_{HESIGA}$ symbols, the HE-SIG-B field may include $N_{HESIGB}$ symbols, the HE-LTF field may include $N_{HELTF}$ symbols, and the HE-DATA field may include $N_{DATA}$ symbols. In an aspect, the HE-DATA field may also be referred to as a payload field, data, data signal, data portion, payload, PSDU, or Media Access Control (MAC) Protocol Data Units (MPDU) (e.g., MAC frame).

In one or more implementations, an AP may transmit frame for downlink (DL) using a frame format shown in this figure or a variation thereof (e.g., without any or some portions of an HE header). A STA may transmit a frame for uplink (UL) using a frame format shown in this figure or a variation thereof (e.g., without any or some portions of an HE header).

The table below provides examples of characteristics associated with the various components of the HE frame 600.

| Element | Definition | Duration | DFT period | GI | Subcarrier Spacing | Description |
| --- | --- | --- | --- | --- | --- | --- |
| Legacy(L)-STF | Non-high throughput (HT) Short Training field | 8 μs | — | — | equivalent to 1,250 kHz | L-STF of a non-trigger-based PPDU has a periodicity of 0.8 μs with 10 periods. |
| L-LTF | Non-HT Long Training field | 8 μs | 3.2 μs | 1.6 μs | 312.5 kHz | |
| L-SIG | Non-HT SIGNAL field | 4 μs | 3.2 μs | 0.8 μs | 312.5 kHz | |
| RL-SIG | Repeated Non-HT SIGNAL field | 4 μs | 3.2 μs | 0.8 μs | 312.5 kHz | |
| HE-SIG-A | HE SIGNAL A field | $N_{HESIGA}$ * 4 μs | 3.2 μs | 0.8 μs | 312.5 kHz | HE-SIG-A is duplicated on each 20 MHz segment after the legacy preamble to indicate common control information. $N_{HESIGA}$ means the number of OFDM symbols of the HE-SIG-A field and is equal to 2 or 4. |
| HE-SIG-B | HE SIGNAL B field | $N_{HESIGB}$ * 4 μs | 3.2 μs | 0.8 μs | 312.5 kHz | $N_{HESIGB}$ means the number of OFDM symbols of the HE-SIG-B field and is variable. DL MU packet contains HE-SIG-B. Single user (SU) packets and UL Trigger based packets do not contain HE-SIG-B. |
| HE-STF | HE Short Training field | 4 or 8 μs | — | — | non-trigger-based PPDU: (equivalent to) 1,250 kHz; trigger-based PPDU: (equivalent to) 625 kHz | HE-STF of a non-trigger-based PPDU has a periodicity of 0.8 μs with 5 periods. A non-trigger-based PPDU is not sent in response to a trigger frame. The HE-STF of a trigger-based PPDU has a periodicity of 1.6 μs with 5 periods. A trigger-based PPDU is a UL PPDU sent in response to a trigger frame. |

-continued

| Element | Definition | Duration | DFT period | GI | Subcarrier Spacing | Description |
|---|---|---|---|---|---|---|
| HE-LTF | HE Long Training field | $N_{HELTF}$ * (DFT period + GI) μs | 2 × LTF: 6.4 μs 4 × LTF: 12.8 μs | supports 0.8, 1.6, 3.2 μs | 2 × LTF: (equivalent to) 156.25 kHz; 4 × LTF: 78.125 kHz | HE PPDU may support 2 × LTF mode and 4 × LTF mode. In the 2 × LTF mode, HE-LTF symbol excluding GI is equivalent to modulating every other tone in an OFDM symbol of 12.8 μs excluding GI, and then removing the second half of the OFDM symbol in time domain. $N_{HELTF}$ means the number of HE-LTF symbols and is equal to 1, 2, 4, 6, 8. |
| HE-DATA | HE DATA field | $N_{DATA}$ * (DFT period + GI) μs | 12.8 μs | supports 0.8, 1.6, 3.2 μs | 78.125 kHz | $N_{DATA}$ means the number of HE data symbols. |

Referring to FIG. 6, the HE frame 600 contains a header and a data field. The header includes a legacy header comprised of the legacy short training field (L-STF), the legacy long training field (L-LTF), and the legacy signal (L-SIG) field. These legacy fields contain symbols based on an early design of an IEEE 802.11 specification. Presence of these symbols may facilitate compatibility of new designs with the legacy designs and products. The legacy header may be referred to as a legacy preamble. In one or more aspects, the term header may be referred to as a preamble.

In one or more implementations, the legacy STF, LTF, and SIG symbols are modulated/carried with FFT size of 64 on a 20 MHz sub-channel and are duplicated every 20 MHz if the frame has a channel bandwidth wider than 20 MHz (e.g., 40 MHz, 80 MHz, 160 MHz). Therefore, the legacy field (i.e., the STF, LTF, and SIG fields) occupies the entire channel bandwidth of the frame. The L-STF field may be utilized for packet detection, automatic gain control (AGC), and coarse frequency-offset (FO) correction. In one aspect, the L-STF field does not utilize frequency domain processing (e.g., FFT processing) but rather utilizes time domain processing. The L-LTF field may be utilized for channel estimation, fine frequency-offset correction, and symbol timing. In one or more aspects, the L-SIG field may contain information indicative of a data rate and a length (e.g., in bytes) associated with the HE frame 600, which may be utilized by a receiver of the HE frame 600 to calculate a time duration of a transmission of the HE frame 600.

The header may also include an HE header comprised of an HE-SIG-A field and an HE-SIG-B field. The HE header may be referred to as a non-legacy header. These fields contain symbols that carry control information associated with each PLCP service data unit (PSDU) and/or radio frequency (RF), PHY, and MAC properties of a PPDU. In one aspect, the HE-SIG-A field can be carried/modulated using an FFT size of 64 on a 20 MHz basis. The HE-SIG-B field can be carried/modulated using an FFT size of e.g., 64 or 256 on a 20 MHz basis depending on implementation. The HE-SIG-A and HE-SIG-B fields may occupy the entire channel bandwidth of the frame. In some aspects, the size of the HE-SIG-A field and/or the HE-SIG-B field is variable (e.g., can vary from frame to frame). In an aspect, the HE-SIG-B field is not always present in all frames. To facilitate decoding of the HE frame 600 by a receiver, the size of (e.g., number of symbols contained in) the HE-SIG-B field may be indicated in the HE-SIG-A field. In some aspects, the HE header also includes the repeated L-SIG (RL-SIG) field, whose content is the same as the L-SIG field. In an aspect, the HE-SIG-A and HE-SIG-B fields may be referred as control signal fields. In an aspect, the HE-SIG-A field may be referred to as a SIG-A field, SIG-A, or SIGA. Similarly, in an aspect, the HE-SIG-B field may be referred to as a SIG-B field, SIG-B, or SIGB.

The HE header may further include HE-STF and HE-LTF fields, which contain symbols used to perform necessary RF and PHY processing for each PSDU and/or for the whole PPDU. The HE-LTF symbols may be modulated/carried with an FFT size of 256 for 20 MHz bandwidth and modulated over the entire bandwidth of the frame. Thus, the HE-LTF field may occupy the entire channel bandwidth of the frame. In one aspect, the HE-LTF field may occupy less than the entire channel bandwidth. In one aspect, the HE-LTF field may be transmitted using a code-frequency resource. In one aspect, an HE-LTF sequence may be utilized by a receiver to estimate MIMO channel between the transmitter and the receiver. Channel estimation may be utilized to decode data transmitted and compensate for channel properties (e.g., effects, distortions). For example, when a preamble is transmitted through a wireless channel, various distortions may occur, and a training sequence in the HE-LTF field is useful to reverse the distortion. This may be referred to as equalization. To accomplish this, the amount of channel distortion is measured. This may be referred to as channel estimation. In one aspect, channel estimation is performed using an HE-LTF sequence, and the channel estimation may be applied to other fields that follow the HE-LTF sequence.

The HE-STF symbols may have a fixed pattern and a fixed duration. For example, the HE-STF symbols may have a predetermined repeating pattern. In one aspect, the HE-STF symbols do not require FFT processing. The HE frame 600 may include the data field, represented as HE-DATA, that contains data symbols. The data field may also be referred to as a payload field, data, payload or PSDU.

In one or more aspects, additional one or more HE-LTF fields may be included in the header. For example, an additional HE-LTF field may be located after a first HE-LTF field. In one or more implementations, a TX signal processing unit 280 (or an IFT 284) illustrated in FIG. 3A may carry out the modulation described in this paragraph as well as the modulations described in other paragraphs above. In one or more implementations, an RX signal processing unit 290 (or an FT 292) may perform demodulation for a receiver.

Figure 7:
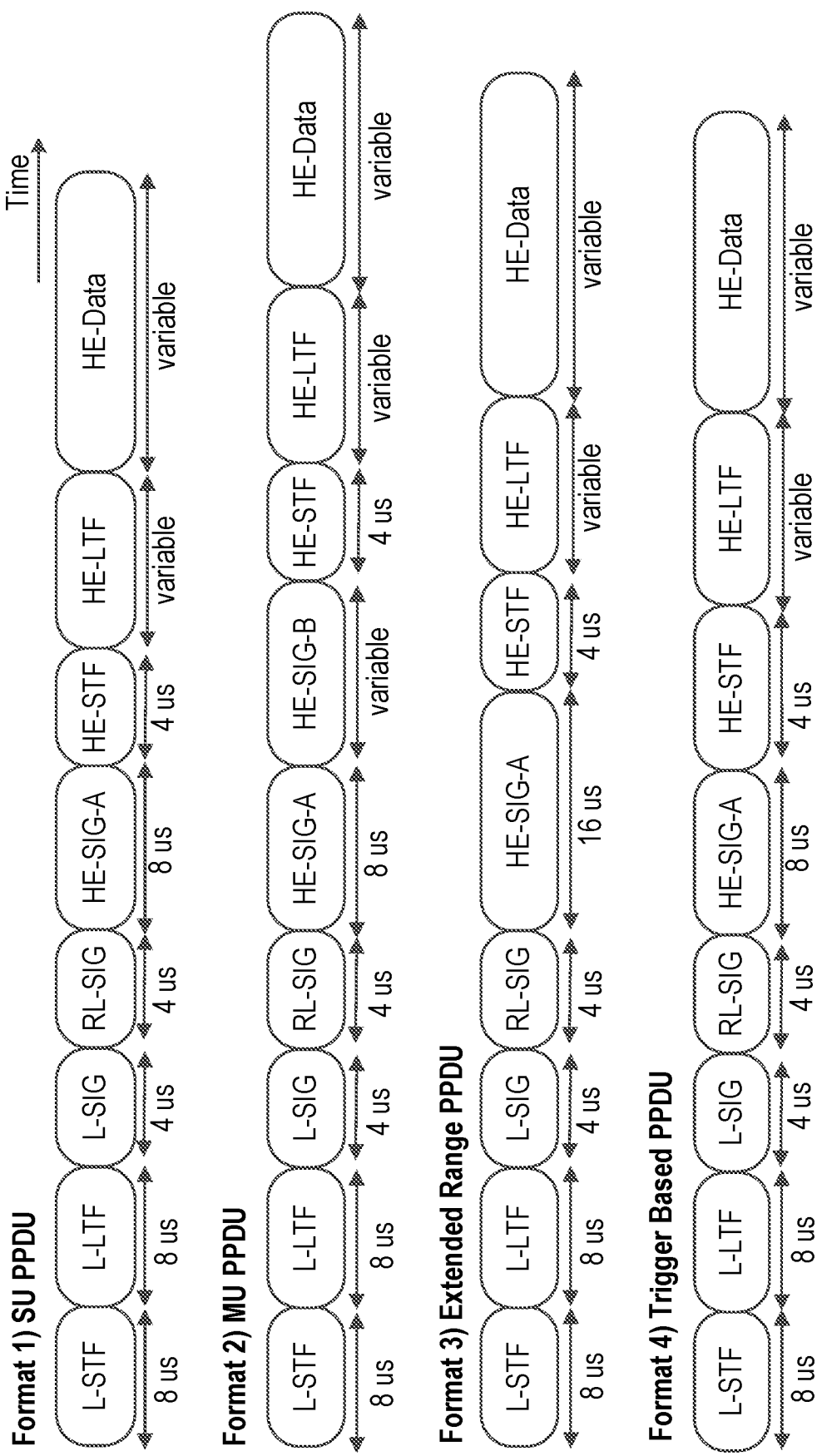
FIG. 7 illustrates examples of transmission signal formats that may be available for signal transmission.

FIG. 7 illustrates four different transmission signal formats that may be available for signal transmission (e.g., HE-based transmission). The four transmission formats include a format for an SU PPDU, an MU PPDU, an extended range PPDU, and a trigger based PPDU. The SU PPDU format can be used in both downlink (DL) and uplink (UL) to transmit SU-MIMO signals. The MU PPDU format can be used in downlink to transmit signals from a single AP to one or more STAs. Additionally, the MU PPDU format can be used in uplink to transmit a signal from a single STA to an AP. The extended range PPDU format is similar to the SU PPDU format. In an aspect, the extended range PPDU format may be used to convey information in coverage limited cases. The trigger based PPDU format can be used to transmit a signal from a STA to an AP. In an aspect, the trigger based PPDU is only sent as a response to a trigger frame (e.g., received by a STA from an AP) that contains, for each participating STA, information about the frequency and spatial resources (e.g., exact frequency and spatial resources) to be used by each participating station to transmit signals. Multiple STAs can transmit the trigger based PPDU at a given time. In an aspect, the data signals (e.g., HE-DATA fields) from different STAs may be orthogonally multiplexed in the frequency and/or spatial domain. In an aspect, the multiple STAs may transmit the trigger based PPDU at a given time as part of a multi-user (MU) uplink (UL) PPDU transmission. In an aspect, all of the transmission formats utilize resource unit(s) as basic building blocks for OFDMA-based transmission.

In one or more implementations, in OFDMA, an access point may allocate different portions of a channel bandwidth to different stations. In one aspect, a portion of a channel bandwidth is allocated to a station. In one aspect, a portion of a channel bandwidth may be a resource unit (RU) or a resource allocation block. In another aspect, a portion of a channel bandwidth may be one or more resource units. In yet another aspect, a portion of a channel bandwidth may be one or more blocks of a channel bandwidth. Each resource unit includes multiple tones. In an aspect, a size of a resource unit may be the number of tones included in the resource unit. In an aspect, a resource unit may be referred to as a block, subband, band, frequency subband, frequency band, or variant thereof (e.g., frequency block). A tone may be referred to as subcarrier. Each tone may be associated with or otherwise identified by a tone index or a subcarrier index. A tone index may be referred to as a subcarrier index.

In one or more aspects, the resource units that may be allocated for a channel bandwidth may be provided by an OFDMA numerology. In an aspect, the OFDMA numerology may be referred to as an OFDMA structure or a numerology. The numerology provides different manners by which to allocate resources for a channel bandwidth (e.g., 20 MHz, 40 MHz, 80 MHz, 80+80/160 MHz channel bandwidth) into individual resource units. In other words, the numerology provides potential resources for OFDMA for stations that support the IEEE 802.11ax specification.

In some aspects, the OFDMA numerology and/or resource unit(s) provided by the numerology are optimized depending on a communication system, such as by taking into consideration tradeoff between OFDMA gain and signaling overhead. In an aspect, the OFDMA gain may include a scheduling/frequency selectivity gain. The OFDMA gain may be achieved by assigning resources to the stations based on frequency selectivity of the stations. For instance, in an aspect, it may be assumed that some specific set of size and position of RUs are given, and BCC interleaver and/or LDPC tone mapper parameters are optimized for certain RUs for a given communication system. In an aspect, the RUs are building blocks to be utilized by a scheduler to assign resources to different stations (e.g., in UL/DL OFDMA). For instance, the scheduler may assign one or more RUs to a station.

Figure 8A:
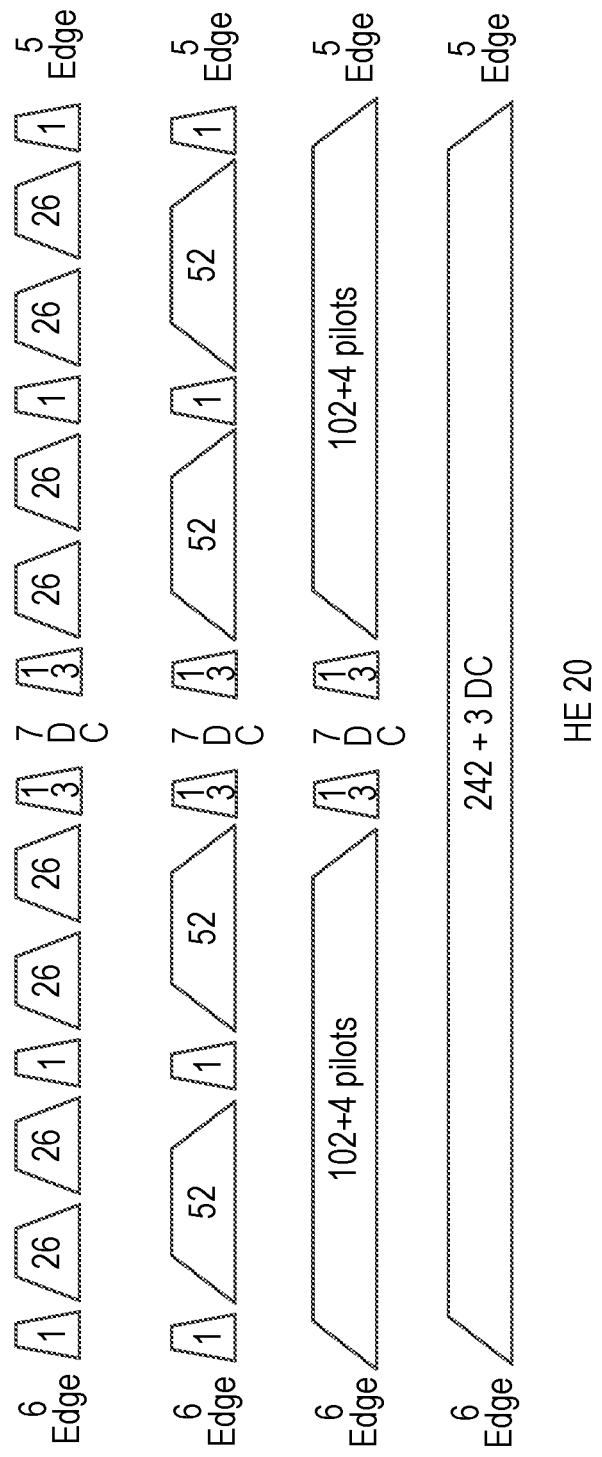
FIGS. 8A, 8B, and 8C illustrate an example numerology for a 20 MHz channel bandwidth, a 40 MHz channel bandwidth, and an 80 MHz channel bandwidth, respectively.
Figure 8B:
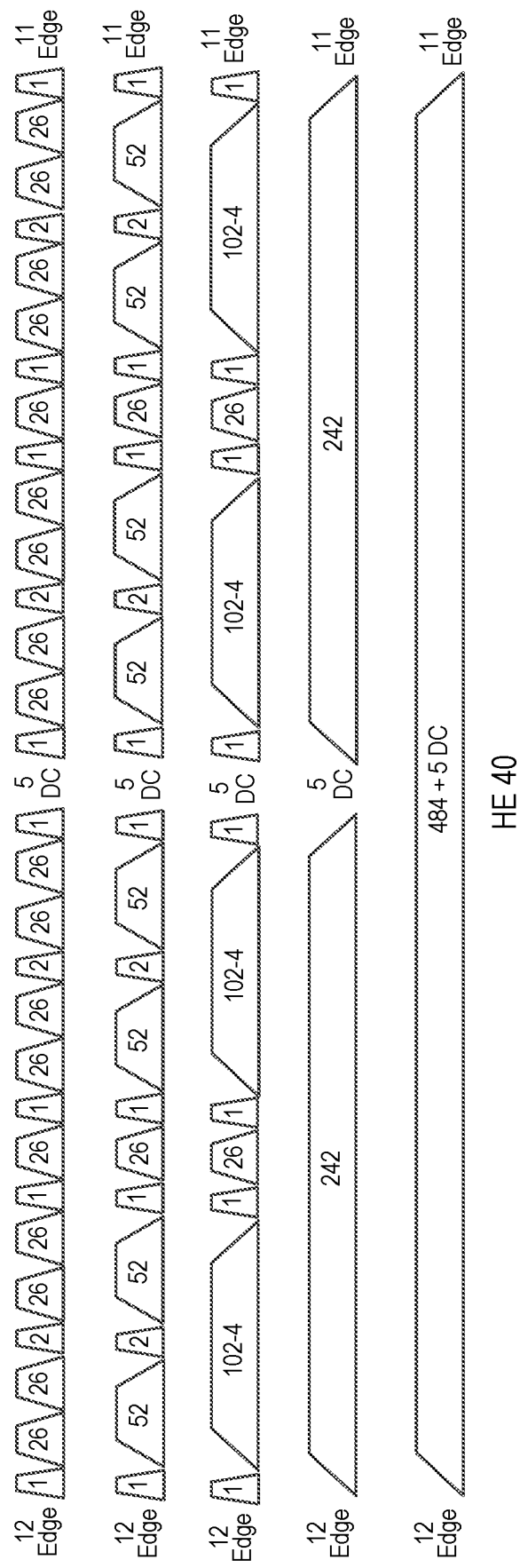
Figure 8C:
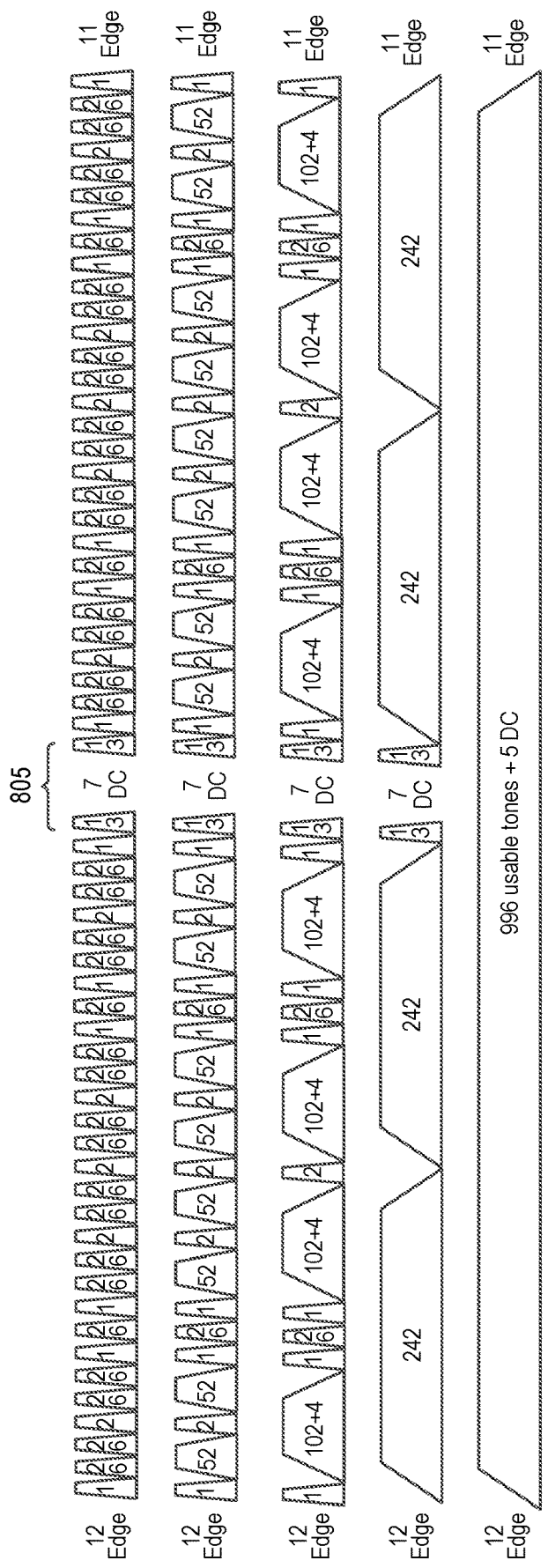

FIGS. 8A, 8B, and 8C illustrate examples of a numerology for a 20 MHz channel bandwidth, a 40 MHz channel bandwidth, and an 80 MHz channel bandwidth, respectively. In an aspect, transmission associated with a 20 MHz, 40 MHz, 80 MHz, and 80+80/160 MHz channel bandwidth may be referred to as 20 MHz, 40 MHz, 80 MHz, and 80+80/160 MHz transmission, respectively. In an aspect, the 20 MHz, 40 MHz, and 80 MHz channel bandwidth may be denoted as HE20, HE40, and HE80, respectively.

In this regard, FIGS. 8A, 8B, and 8C illustrate the resource units for the 20 MHz, 40 MHz, and 80 MHz channel bandwidth, respectively. For instance, as shown in FIG. 8A, the 20 MHz OFDMA structure uses 26-tone RU(s), 52-tone RU(s), and 106-tone RU(s) at fixed positions. As shown in FIG. 8B, the 40 MHz OFDMA structure may be two replicas of the 20 MHz OFDMA structure. As shown in FIG. 8C, the 80 MHz OFDMA structure may be formed of two replicas of the 40 MHz OFDMA structure on top of one central 26-tone RU (denoted as 805). Within 80 MHz, the OFDMA design supports six different RU sizes: 26, 52, 106, 242, 484, and 996. In an aspect, the size of an RU may be the number of tones included in the RU. The 80+80/160 MHz OFDMA structure may be two replicas of the 80 MHz OFDMA structure. Each station (e.g., user) can be allocated one or more of the RUs shown in FIG. 8A, 8B, or 8C when the channel bandwidth is 20 MHz, 40 MHz, or 80 MHz, respectively. It is noted that the bottom-most row in each of FIGS. 8A, 8B, and 8C illustrate the non-OFDMA case.

In the 20 MHz and 80 MHz channel bandwidth, the central 26 RU is split into two 13 subcarrier (or tone) components due to direct current (DC) subcarriers (or tones). In particular, as shown in FIGS. 8A and 8C, the two 13 subcarrier (or tone) components are separated by 7 DC subcarriers (or tones). In an aspect, on top of OFDMA, MU-MIMO may be integrated to the RUs. Such integration of MU-MIMO to the RUs may outperform SU OFDMA in some cases considering overhead. In an aspect, each of the 80+80 MHz transmission and 160 MHz transmission may have similar OFDMA structures, with a center 26 RU being present at the center of each 80 MHz band and 7 DC subcarriers (or tones) between split tones. Hence, the 80+80 MHz transmission has two center 26 RUs, where each center 26 RU is split into two 13 subcarriers (or tones), and the two 13 subcarriers (or tones) are separated by 7 DC subcarriers (or tones). Likewise, the 160 MHz transmission has two center 26 RUs, where each center 26 RU is split into two 13 subcarriers (or tones), and the two 13 subcarriers (or tones) are separated by 7 DC subcarriers (or tones).

Figure 9:
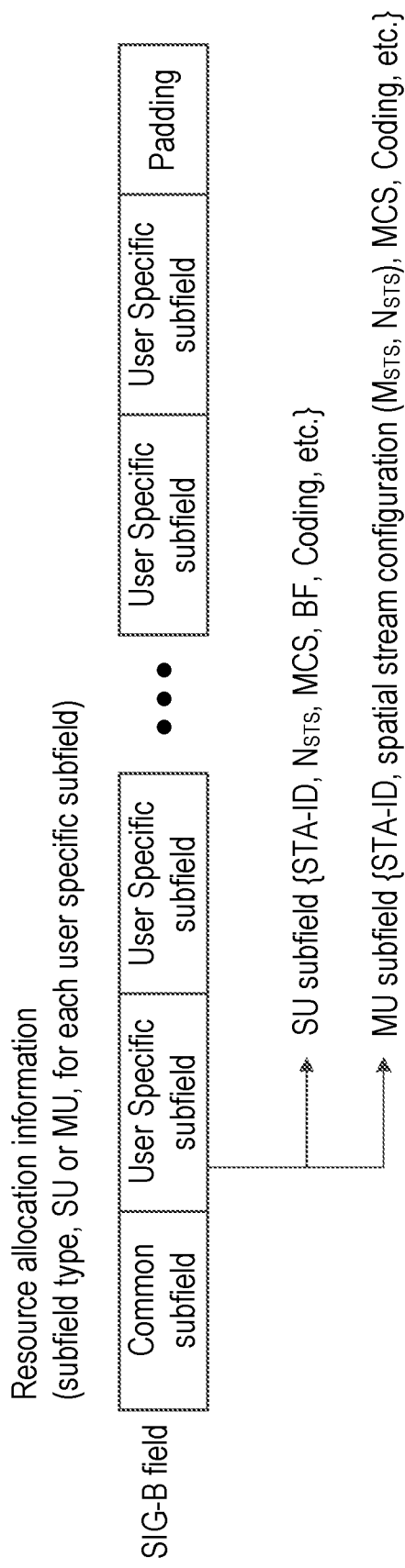
FIG. 9 illustrates an example of a high efficiency signal-B field (HE-SIG-B) field.

FIG. 9 illustrates an example of an HE-SIG-B field. The HE-SIG-B field may include a common subfield followed by one or more user specific subfields. A last user specific subfield may be followed by padding (e.g., padding bits). The control information transmitted in the HE-SIG-B field may include common control information, contained in the common subfield, and station (STA) specific information, contained in the user specific subfields.

In an aspect, the common subfield may be referred to as a common field, common information field, a common block field, or variants thereof (e.g., common block subfield). In an aspect, the one or more user specific subfields form a user specific field. In an aspect, user specific information may be referred to as station (STA) specific information. In an aspect, the common control information includes control information that needs to be shared for all STAs. In an aspect, the STA specific control information is control information dedicated to a specific STA. For instance, each user specific subfield in FIG. 9 may include control information for one station.

The common subfield may identify designated stations and include the information (e.g., resource allocation information) for all the designated stations. In an aspect, the common subfield may contain information regarding the resource unit allocation/assignment such as the RU arrangement in the frequency domain, the RUs allocated for MU-MIMO and/or OFDMA, and the number of users in MU-MIMO and/or OFDMA allocations. In this regard, the HE-SIG-B field may be a control signal field that includes resource allocation information (e.g., RU allocation information) as well as other control signaling information for facilitating correct reception of data signals. In an aspect, the resource allocation information as well as other control signaling information may be necessary for correct reception of data signals. The common subfield may include a subfield type (e.g., SU or MU) for each user specific subfield.

One or more of the user specific subfields are for each designated receiving STA. In an aspect, the user specific subfield may be one of two types, SU subfield type or MU subfield type. Depending on the resource allocation information, each user specific subfield may be one of the SU subfield or the MU subfield. In an aspect, a size/length of the user specific subfield may be based at least in part on the type of the user specific subfield and the number of user specific subfields (e.g., the number of stations). The SU subfield may include a station identifier (STA-ID) that addresses the station, number of space time streams $N_{STS}$, modulation and coding scheme (MCS), beamforming (BF) (e.g., transmit beamforming (TxBF)), coding (e.g., indication for use of LDPC), etc. The MU subfield may contain information similar to the SU subfield, including, for example, the STA-ID, $N_{STS}$, MCS, and coding. In an aspect, a distinction between SU and MU subfield is that MU subfield contains information regarding spatial stream configuration (e.g., in spatial configuration field(s)). In an aspect, the MU subfield may contain a total number of space time streams, denoted as $L_{STS}$. In some cases, the $L_{STS}$ may be utilized for determining the number of HE-LTF symbols.

In an aspect, in an SU-MIMO transmission mode, each user occupies $N_{STS}$ space time streams. In an aspect, in an MU-MIMO transmission mode, each user occupies a subset of the total number of space time streams. The total number of space time streams may be denoted as $L_{STS}$ and the subset may be denoted as $N_{STS}$. Thus, the $N_{STS}$ of a user k is equal to or smaller than the $L_{STS}$. In an aspect, in the MU-MIMO transmission mode, the transmitter indicates the logical order of the spatial stream assignment to each user, provided by the $M_{STS}$ and $N_{STS}$ in FIG. 9. For example, the transmitter can indicate a starting spatial stream index, $M_{STS}$, and the number of space time streams, $N_{STS}$, for a specific user. In an aspect, as long as the space time streams for different MU-MIMO users do not overlap, each user can correctly receive signals from the transmitter. In an aspect, when the size of station specific information for both SU and MU (e.g., SU-MIMO, MU-MIMO) are the same, the type information need not be utilized to calculate the length of the SIG-B field.

Figure 10:
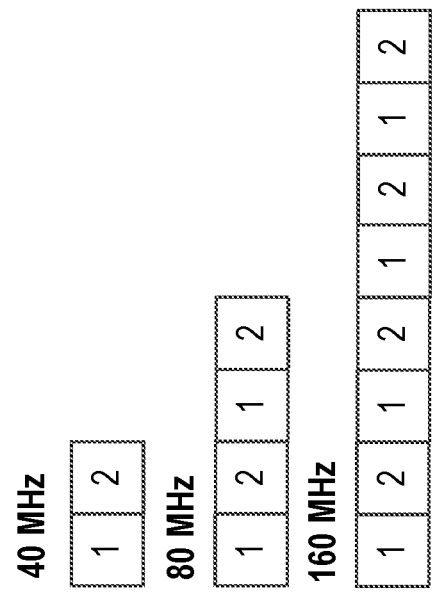
FIG. 10 illustrates examples of a coding structure of an HE-SIG-B field for 40 MHz, 80 MHz, and 160 MHz channel bandwidth.

In one or more aspects, for channel bandwidths greater than or equal to 40 MHz, the number of 20 MHz subbands carrying different content for HE-SIG-B is two. FIG. 10 illustrates examples of a coding structure of an HE-SIG-B field for 40 MHz, 80 MHz, and 160 MHz channel bandwidth. In an aspect, the SIG-B coding structure may be referred to as a SIG-B field mapping structure. Each square in FIG. 10 represents a 20 MHz subband, and the number 1 and 2 represent different signaling/control information. In an aspect, the "1" may be referred to as coding block 1 or SIG-B coding block 1. Similarly, in an aspect, the "2" may be referred to as coding block 2 or SIG-B coding block 2. In an aspect, a coding block may be referred to as a content channel, such that coding block 1 and coding block 2 may be referred to as content channel 1 (or SIG-B content channel 1) and content channel 2 (or SIG-B content channel 2), respectively. In an aspect, coding block 1 may be referred to as a first HE-SIG-B field and coding block 2 may be referred to as a second HE-SIG-B field. The HE-SIG-B field of FIG. 10 may be composed of one or more first HE-SIG-B fields in one or more subbands (e.g., 20 MHz subbands) and one or more second HE-SIG-B fields in the remaining subband(s).

In some aspects, in 20 MHz transmission, a single SIG-B coding block is transmitted. In some aspects, in 40 MHz transmission, two SIG-B coding blocks, represented as 1 and 2, are transmitted. Each of the two SIG-B coding blocks may span one of the two 20 MHz subbands that form the 40 MHz channel bandwidth. Each of the two SIG-B coding blocks may convey information about resources in its corresponding 20 MHz bandwidth.

In some aspects, in 80 MHz transmission, two SIG-B coding blocks are transmitted. Each of the two SIG-B coding blocks may span a respective 20 MHz bandwidth. In an aspect, each of the two SIG-B coding blocks is replicated twice in the frequency domain, resulting in a SIG-B field that spans the 80 MHz channel bandwidth in a coding block 1, coding block 2, coding block 1, coding block 2 (1-2-1-2) structure. In this regard, as shown in FIG. 10 for 80 MHz, in an aspect, a first and third 20 MHz bandwidth may contain the same content, represented as 1, whereas a second and fourth 20 MHz bandwidth may contain the same content, represented as 2. In an aspect, in 160 MHz transmission, two SIG-B coding blocks are transmitted, where each SIG-B coding block spanning 20 MHz is replicated four times in frequency domain to result in a SIG-B field that span 160

MHz. Each SIG-B coding block contains control information of resources in four 20 MHz blocks.

Each SIG-B coding block contains control information of resources for a respective 20 MHz block. FIGS. 11A, 11B, 11C, and 11D illustrate examples of such SIG-B mapping for a 20 MHz, a 40 MHz, an 80 MHz, and a 160 MHz channel bandwidth, respectively.

Each coding block of the SIG-B field may include a common block field and a user specific field. The common block field may include multiple RU allocation fields, where each RU allocation field is associated with resource allocation in a respective 20 MHz bandwidth. For instance, in FIG. 11B, the SIG-B field includes "RU Allocation Signaling Channel A (20 MHz)" and its corresponding "Per-User Allocation Information", and "RU Allocation Signaling Channel B (20 MHz)" and its corresponding "Per-User Allocation Information". The RU allocation field denoted as "RU Allocation Signaling Channel A (20 MHz)" may designate a first set of stations and the "Per-User Allocation Information" adjacent to the "RU Allocation Signaling Channel A (20 MHz)" may include user specific information for the first set of stations. The RU allocation field denoted as "RU Allocation Signaling Channel B (20 MHz)" may designate a second set of stations and the "Per-User Allocation Information" adjacent to "RU Allocation Signaling Channel B (20 MHz)" may include user specific information for the second set of stations. In an aspect, the RU allocation field may be 8 bits per 20 MHz bandwidth. In this aspect, each of the "RU Allocation Signaling Channel A" and "RU Allocation Signaling Channel B" is associated with a respective 20 MHz band and includes 8 bits.

Figure 11A:
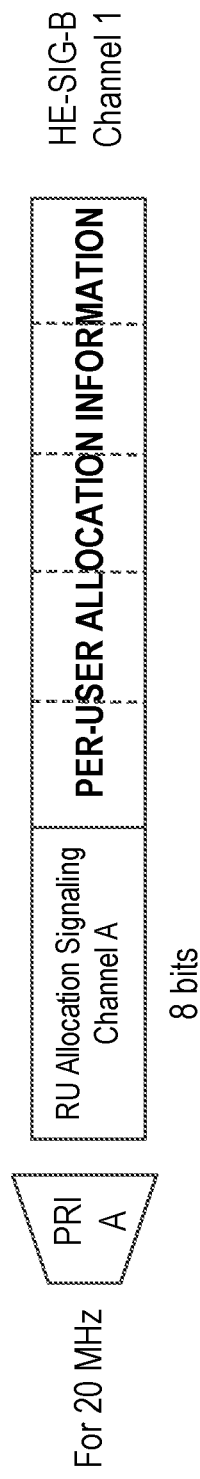
FIGS. 11A, 11B, 11C, and 11D illustrate examples of an HE-SIG-B mapping for a 20 MHz, 40 MHz, an 80 MHz, and a 160 MHz bandwidth, respectively.
Figure 11B:
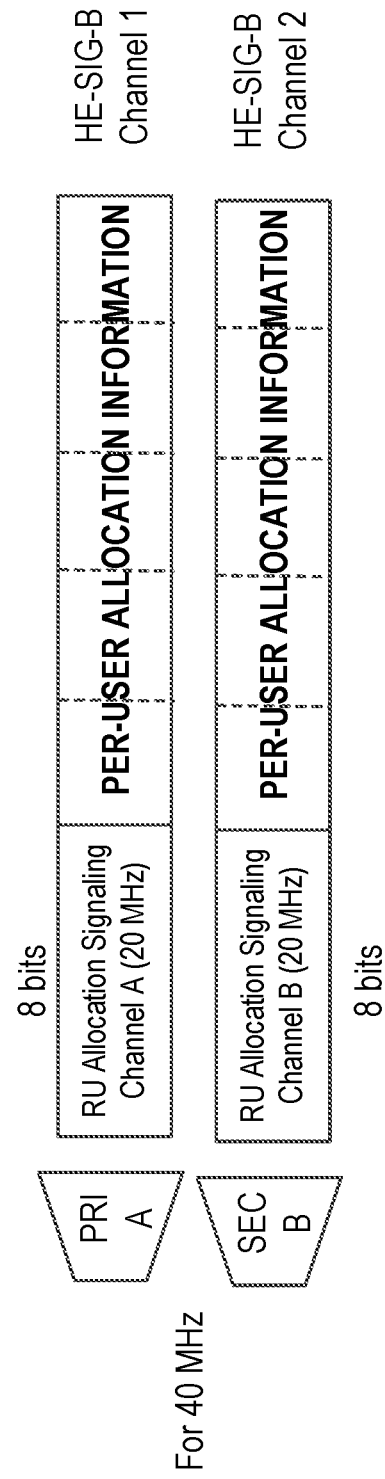
Figure 11C:
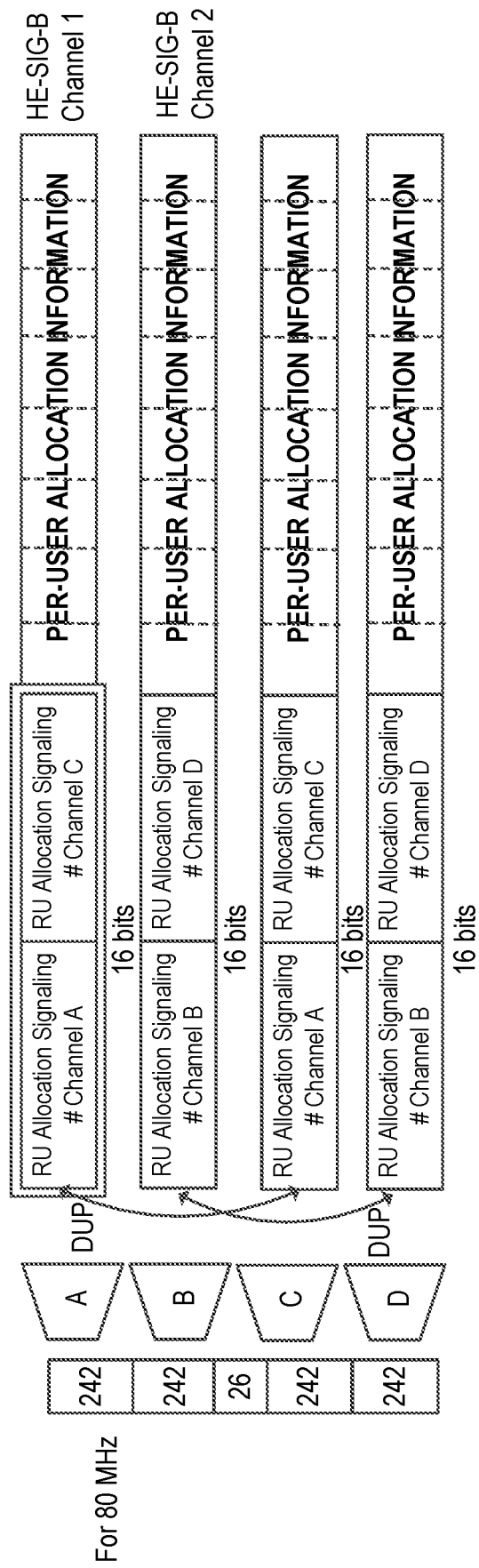
Figure 11D:
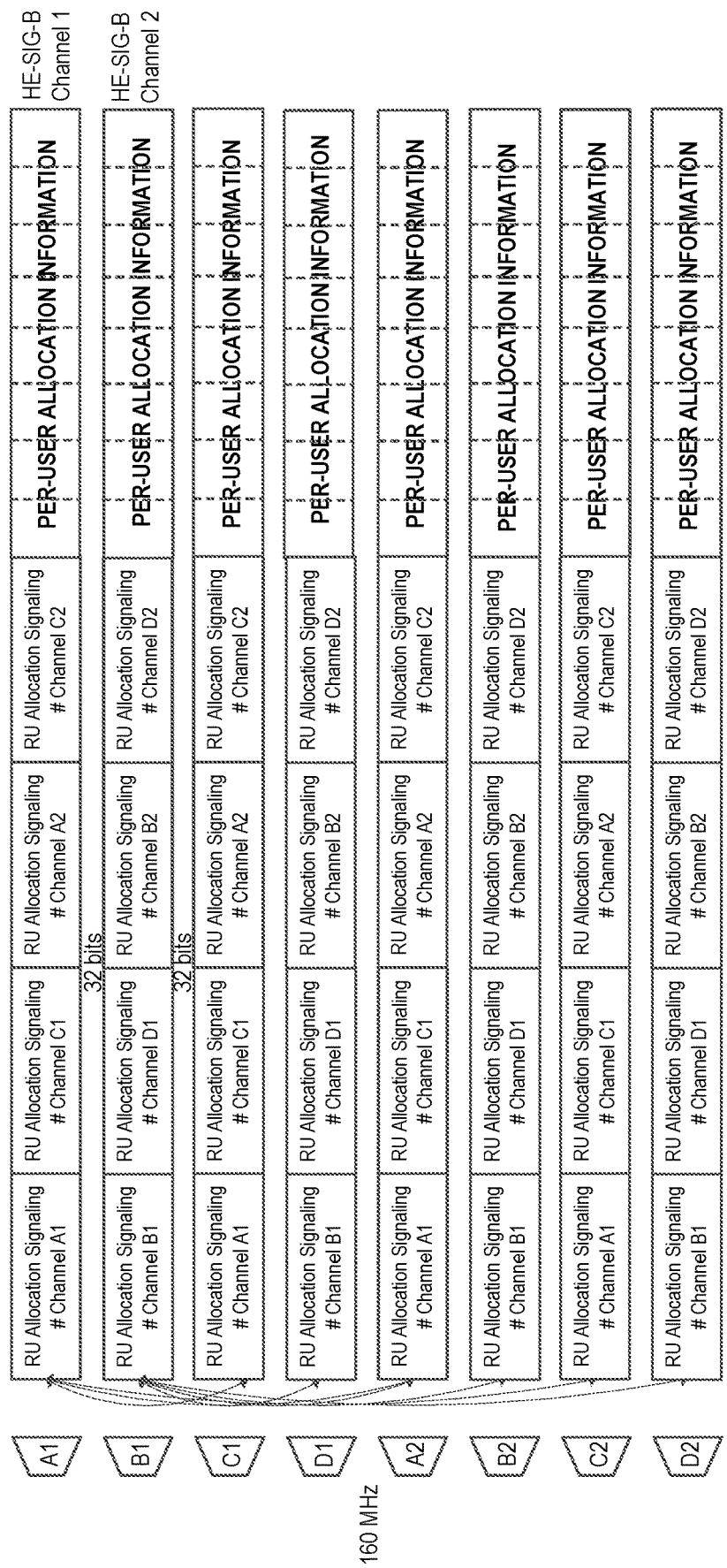

For 80 MHz transmission, the content of the HE-SIG-B field in the first and third 20 MHz bands, denoted as A and C, respectively, is identical (indicated by DUP in FIG. 11C). The information carried in either of these bands may be referred to as HE-SIG-B channel 1. HE-SIG-B channel 1 carries signaling information for all STAs whose payloads occupy some tones in the first or third 20 MHz bands. Similarly, the content of the HE-SIG-B field in the second and fourth 20 MHz bands, denoted as B and D, respectively, are identical. The information carried in either of these bands may be referred to as HE-SIG-B channel 2. HE-SIG-B channel 2 carries signaling information for all STAs whose payloads occupy some tones in the second or fourth 20 MHz bands. In an aspect, the RU allocation field may be 8 bits per 20 MHz bandwidth. In this aspect, each of the "RU Allocation Signaling #Channel A", "RU Allocation Signaling #Channel C", "RU Allocation Signaling #Channel B", and "RU Allocation Signaling #Channel D" is associated with a respective 20 MHz band and includes 8 bits. In an aspect, the RU allocation field in each 20 MHz band may be encoded together. For instance, the "RU Allocation Signaling #Channel A" and "RU Allocation Signaling #Channel C" of the first 20 MHz band may be encoded together.

For 160 MHz transmission, the content of the HE-SIG-B field in the first, third, fifth, and seventh 20 MHz bands, denoted as A1, C1, A2, and C2, are identical. The information carried in any of these bands may be referred to as HE-SIG-B channel 1. HE-SIG-B channel 1 carries signaling information for all stations whose payloads occupy some tones in the first or third or fifth or seventh 20 MHz band. Similarly, the content of the HE-SIG-B field in the second, fourth, sixth, and eighth 20 MHz bands, denoted as B1, D1, B2, and D2, are identical. The information carried in any of these bands may be referred to as HE-SIG-B channel 2. HE-SIG-B channel 2 carries signaling information for all STAs whose payloads occupy some tones in the second or fourth or sixth or eighth 20 MHz band.

In one or more aspects, methods are provided for identifying a user specific subfield format. In an aspect, there may be a different amount of STA specific information depending on each STA. For example, STA1 assigned for SU-MIMO in RU of OFDMA and STA2 assigned for MU-MIMO in RU of OFDMA may need different subfields to indicate control information of its own scheme. In order to correctly calculate and find subfields designated to each STA, a Type subfield that contains a Type indication may be introduced in a SIG field (e.g., SIG-B field) for IEEE 802.11ax. In accordance with its Type, a STA specific information of a fixed size may be assigned. In other words, the size of the STA specific information may be based on the Type. The Type subfield may indicate an SU type (single user allocation), MU type (multi-user allocation), frequency repetition type, and so on in MU. The frequency repetition type may indicate to the STA that there are duplicated RUs.

FIG. 12 illustrates an example of an HE-SIG-B field. The HE-SIG-B field includes coding block 1 and coding block 2. Coding block 1 includes a common block field and STA specific subfields for STA1-1, STA1-2, . . . , STA1-M. Coding block 2 includes a common block field and STA specific subfields for STA2-1, STA2-2, . . . , STA2-N.

In an aspect, an explicit indication of Type subfield (e.g., SU type, MU type) may be included within the STA specific control information. As shown in FIG. 12, the Type subfield may be located in a front part within each STA specific information subfield. In an aspect, the first bit or first bits of the STA specific information subfield may be the indication. In an aspect, the Type subfield and/or the Type indication may be one bit. For instance, this bit may be the first bit of each user specific field. After the common block field of each content channel, once each station detect/decodes its STA specific subfield correctly, the station determines the type and the size (e.g., expected size) of its own STA specific information.

FIG. 13 illustrates an example of an HE-SIG-B field. The description from FIG. 12 generally applies to FIG. 13, with examples of differences between FIG. 12 and FIG. 13 and other description provided herein for purposes of clarity and simplicity. In an aspect, as shown in FIG. 13, the HE-SIG-B field may include the Type subfield or the Type information within the common control information (e.g., common block field). In such an aspect, the Type subfield or Type information may include an indication of each user's STA specific control information format type (e.g. SU-based format, MU-based format). Each STA may determine the format type of the STA specific information based on information (e.g., the indication) included in the common information subfield. By way of non-limiting example, the information given in the common information field may include allocated RU size for the corresponding STA specific information and number of scheduled users for the allocated RU size. In an aspect, based on an RU allocation and size of each RU indicated by the Type subfield in the common information, a STA may easily find its own STA specific information block.

Figure 14:
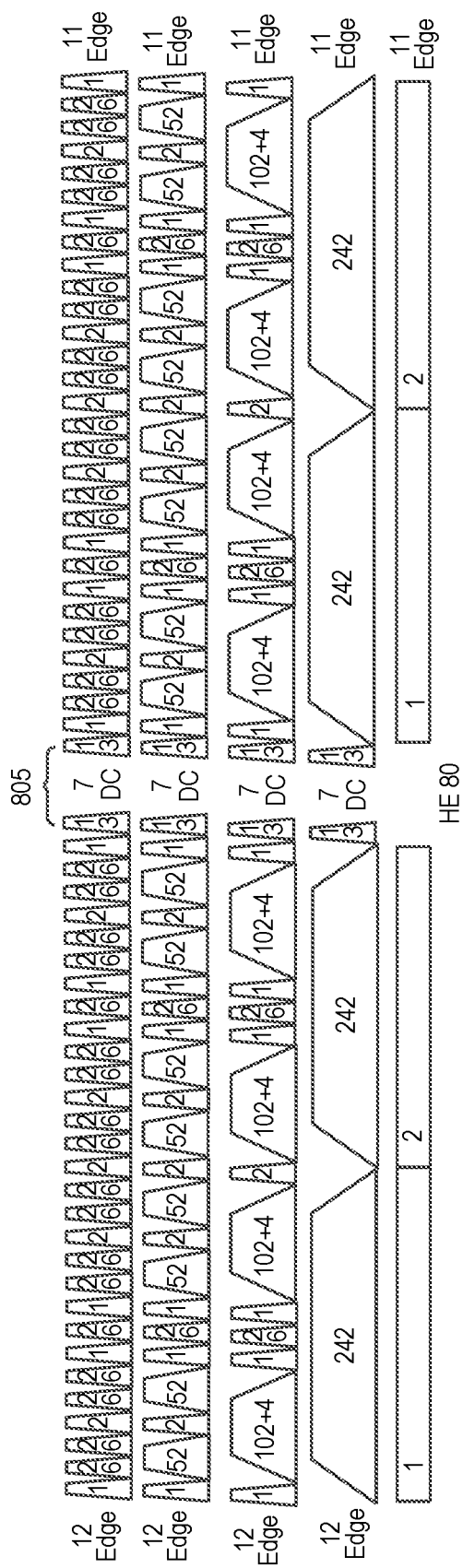
FIG. 14 illustrates an example of an 80 MHz numerology.

FIG. 14 illustrates an example of an 80 MHz numerology with the special 26 RU labeled. The special 26 RU is denoted as 805. The special 26 RU may be in the middle of the 80 MHz operating bandwidth. In an aspect, the special 26 RU may be assigned to either coding block 1 or coding block 2. In another aspect, if common information and STA specific information of a coding block is assumed to apply to the corresponding subband channel, the special 26 RU may be assigned to coding block 1 and coding block 2 since the special 26 RU does not have explicitly the corresponding subband channel. This may cause the same STA specific information subfield associated with the special 26 RU to exist in the two coding blocks.

In one or more aspects, resource allocation of the special 26 RU may be signaled in the HE-SIG-B field. Methods are provided for conveying control information for the special 26 RU in 80 MHz and 160 MHz OFDMA data transmission. The conveying of such control information may facilitate reduction in signaling overhead.

In the case of 80 MHz transmission, 80+80 MHz transmission, or 160 MHz transmission, a transmitter may be able to transmit (e.g., may be allocated) a special RU located in the center of each 80 MHz band. The special RU may have a size of 26 subcarriers. In an aspect, the special 26 RU may be referred to as a special central RU, special center 26 RU, special center 26, special center 26 unit, center 26 unit, or variants thereof. The special 26 RU in the case of 80 MHz signal transmission is shown in FIG. 14 and denoted as 805. The center 26 RU is split into two 13 subcarrier blocks due to the 7 DC tones in the center.

With reference back to FIG. 14, the two transmission subbands of the SIG-B field are denoted as 1 and 2. In an aspect, because the special 26 RU exist on the boundary of the transmission subbands of the SIG-B field, the special 26 RU may be allowed to be signaled in one or both of the SIG-B coding blocks.

In some aspects, control information, such as resource allocation, for the center 26 RU may be signaled in (e.g., transmitted in) the HE-SIG-B field in the primary 20 MHz channel. In an aspect, the primary 20 MHz channel may be channel 1 or channel 2. The AP may select either channel 1 or channel 2 as the primary 20 MHz channel, and may indicate to the stations which channel is the primary 20 MHz channel when the AP engages with the stations (e.g., during an association procedure between the AP and the stations). Depending on the implementation, a station may detect and decode the one coding block over the primary channel and find its RU allocation as the special 26 RU.

In an aspect, when the AP is operating in 80 MHz channel bandwidth, the AP may designate any one of the four 20 MHz blocks within the 80 MHz channel bandwidth as the primary 20 MHz channel. The AP may signal the designated primary 20 MHz channel during an association procedure between the AP and the stations. In an aspect, because the primary 20 MHz channel is static (e.g., chosen for a long term basis), each station can determine the primary 20 MHz channel before the station receives the HE-SIG-B field or portions (e.g., coding blocks) thereof. The common information field of the HE-SIG-B field occupying the primary 20 MHz may have additional signaling for the special 26 RU allocation.

Figure 15:
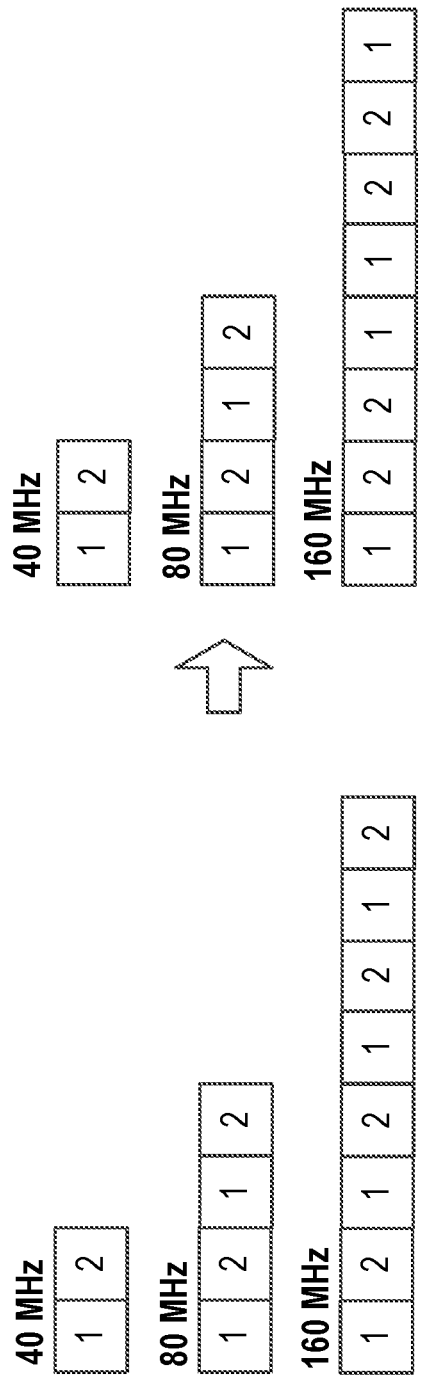
FIG. 15 illustrates an example of a coding structure for an HE-SIG-B field for a 40 MHz, 80 MHz, and 160 MHz channel bandwidth.

In some aspects, the SIG-B field transmission structure can be modified such that the center special 26 RU is centered within the transmission signal bandwidth of a single SIG-B coding block. In an aspect, the special 26 RU may be assigned to only one coding block without any ambiguity. FIG. 15 illustrates an example of such a SIG-B coding structure for a 40 MHz, 80 MHz, and 160 MHz channel bandwidth. With the SIG-B coding structure of FIG. 15, control information for the special 26 RU can be conveyed in a second SIG-B coding block, denoted by the number 2 in FIG. 15. In some aspects, resource allocation of the special 26 RU may be signaled with a STA specific subfield (e.g., an additional/extra STA specific subfield). In an aspect, the RU allocation field of the common information subfield of the SIG-B field (e.g., in each HE-SIG-B coding block) may contain resource allocation information (e.g., resource assignments) of all RUs except the special 26 RU. The presence of the special 26 RU may be conveyed by transmissions of an extra STA specific subfield in either one of the SIG-B coding blocks.

In an aspect, without additional indication, resource allocation of the special 26 RU may be located in either coding block 1 or coding block 2 depending on load balance. In accordance with different circumstances, there may exist an unbalanced RU allocation and/or an unbalanced number of STAs distribution, which may lead to an unbalanced amount of control information in coding block 1 and coding block 2. For instance, coding block 1 may include information associated with more stations than coding block 2. In these cases, in order to match the end of an OFDM symbol for the two coding blocks, padding (e.g., padding bits) may occupy the rest of the OFDM symbol. In this regard, it is noted that, in general, coding block 1 and coding block 2 are padded with dummy bits (e.g., a non-valid STA specific information) such that the number of OFDM symbols for the two SIG-B coding blocks is identical. In an aspect, at least some of the padding may be replaced with control information for signaling resource allocation information of the special 26 RU. In other words, an empty room/space (e.g., generally containing padding) of either coding block 1 or coding block 2, or both, may be utilized to contain STA specific information of the special 26 RU.

Figure 16:
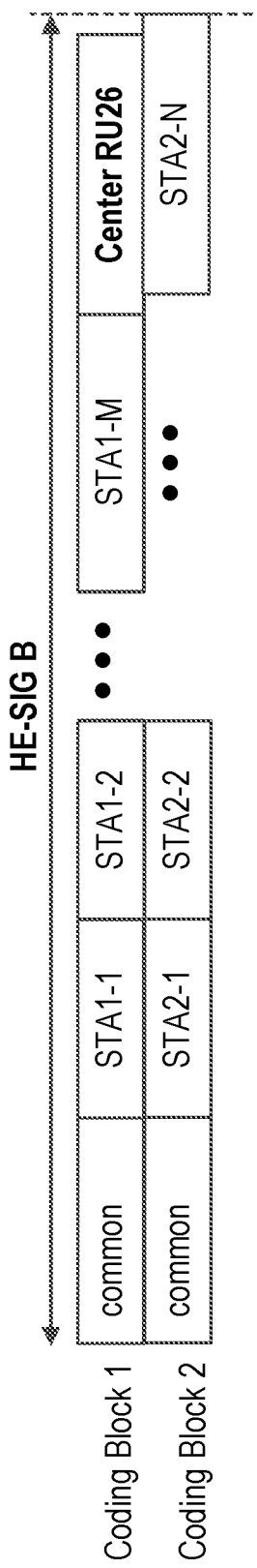
FIGS. 16 and 17 illustrate examples of an HE-SIG-B field including a subfield associated with a special 26 resource unit.

FIG. 16 illustrates an example of an HE-SIG-B field including a subfield (e.g., STA specific subfield) associated with the special 26 RU. The subfield associated with the special 26 RU is denoted as Center RU26. In an aspect, the common information subfield of coding block 1 of the SIG-B field may contain information that indicates M number of resource unit blocks (e.g., M number of STA specific information blocks) follow the common information subfield of coding block 1. These M stations may be identified as STA-1, STA1-2, . . . STA1-M. Similarly, the common information subfield of coding block 2 may contain information that indicates N number of resource unit blocks (e.g., N number of STA specific information blocks) follow the common information subfield of coding block 2. These N stations may be identified as STA2-1, STA2-2, . . . STA2-N. In an aspect not shown in FIG. 16, the M stations of coding block 1 may be identified as STA1, STA2, . . . STA M, and the N stations of coding block 2 may be identified as STA1, STA2, . . . , STA N, where STA1 of coding block 1 is different from STA1 of coding block 2, STA2 of coding block 2 is different from STA2 of coding block 2, and so forth. The values for M and N may be, but need not be, the same.

The common information field in each HE-SIG-B coding block contains the resource assignments other than the special 26 RU. In an aspect, there exists an implicit (or explicit) mapping between the RU assigned and the order and the number the STA specific information (denoted as STA1-1, STA1-2, . . . , STA-M field in FIG. 16). In an aspect, the receiver may be able to identify the total number of STA specific information (e.g., M value) from parsing the common information field. If the total length of the HE-SIG-B coding block is long enough such that special RU 26 control information can be inserted between the last STA specific information and the end of the HE-SIG B coding block, then the receiver can assume that there is a special RU 26 assigned and can parse that information field (e.g., for assignment check).

In an aspect, if there exists a STA specific subfield (e.g., a valid STA specific subfield) after either the M STA specific information blocks of coding block 1 and/or after the N STA specific information blocks of coding block 2, then the STA may assume that it is for the special 26 RU. The validity of the STA specific subfield for the special 26 RU can be checked using, for instance, a cyclic redundancy check (CRC) and STA-ID. In an aspect, in order to distinguish between the special RU 26 assignment and bit padding for the HE-SIG-B coding block, the special RU 26 may include a specific bit (e.g., one bit) or a specific bit sequence (e.g., including multiple bits) that is different from a padding bit sequence such that the receiver is able to differentiate between the special RU 26 assignment and padding bits.

As shown in FIG. 16, when there is empty room/space within coding block 1, the STA specific information of the special 26 RU may be allowed to be included in coding block 1. In an aspect, no common information indicates the presence of RU allocation of the special 26 RU. In an aspect, since the stations can distinguish between padding bits and STA specific information, such as MCS, AID, etc., the stations are able to identify the subfield associated with the special 26 RU.

In some aspects, if the special 26 RU is assigned, the user specific field for the special 26 RU in a channel bandwidth greater than or equal to 80 MHz (e.g., 80 MHz, 80+80 MHz, 160 MHz) may be located at the end of user specific fields in either SIG-B content channel 1 or SIG-B content channel 2. In some cases, such as shown in FIG. 16, the user specific field of the special 26 RU may be in SIG-B content channel 1. For instance, for 80 MHz, the user specific field for the special 26 RU may be included in SIG-B content channel 1. In other cases, the user specific field of the special 26 RU may be in SIG-B content channel 2. In an aspect, the user specific field may be in SIG-B content channel 1 for a lower 80 MHz band and SIG-B content channel 2 for an upper 80 MHz band in the 160 MHz channel bandwidth. An HE-SIG-B field with the special 26 RU is described, for example, with respect to FIGS. 16, 17, 19A, and 19B.

Figure 17:
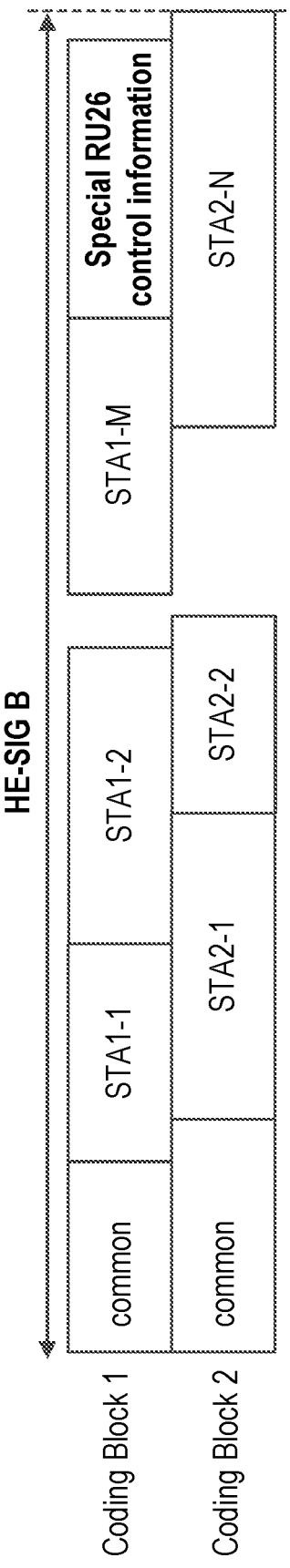

FIG. 17 illustrates another example of an HE-SIG-B field including a subfield (e.g., STA specific subfield) associated with the special 26 RU. The description from FIG. 16 generally applies to FIG. 17. In FIG. 17, the STA specific information subfield associated with the special center 26 RU is denoted as Special RU26 control information.

In some aspects, the SIG-B field may be separately encoded on each 20 MHz band. In an aspect, the SIG-B field is encoded on a per 20 MHz basis using BCC with common and user blocks separated in the bit domain. The SIG-B field can be composed of multiple BCC blocks. The encoding of the SIG-B field in multiple BCC blocks may assist/facilitate decoding.

Figure 18:
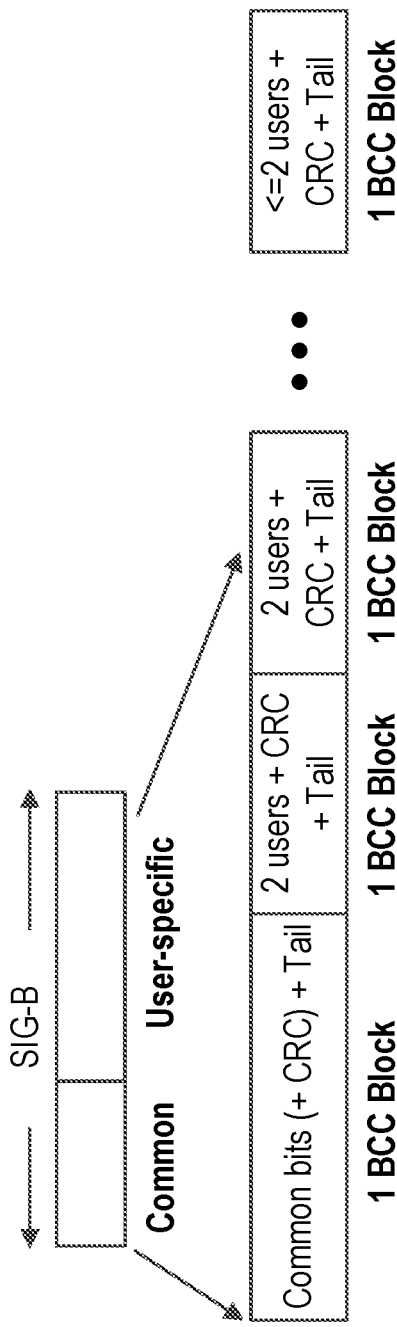
FIG. 18 illustrates an example of an HE-SIG-B field encoded as binary convolutional code (BCC) blocks.

FIG. 18 illustrates an example of an HE-SIG-B field encoded as BCC blocks. Each BCC block may include information bits (e.g., common information, STA specific information) and tail bits (e.g., 6 tail bits) for trellis termination. In FIG. 18, the common information subfield is encoded in a single BCC block, and every two STA specific information subfield are encoded in a single BCC block. In other words, two users (e.g., two STAs) are grouped together and jointly encoded in each BCC block in the user specific field of the SIG-B field. In a case that there are an odd number of STA specific information subfields, the last STA specific information subfield (one STA specific information subfield) can be encoded in a single BCC block. In an aspect, the common block has a CRC separate from a CRC of the user specific blocks.

In some aspects, additional signaling may be conveyed in the SIG-B field (or in the SIG-A field) to indicate the extra presence of STA specific information subfield(s) other than those indicated by resource allocation field of the common information subfield. In this regard, the additional signaling may indicate the presence of a STA specific information subfield associated with the special center 26 RU. For instance, the STA specific information subfield associated with the special center 26 RU is denoted as Center RU26 in FIG. 16 and Special RU26 control information in FIG. 17. In an aspect, the BCC block is defined for every two consecutive STA specific information subfields, including the STA specific information subfield for the special 26 RU.

In an aspect, the RU allocation subfield of the common information subfield of the SIG-B field (e.g., in each HE-SIG-B coding block) may contain resource allocation information (e.g., resource assignments) of all RUs except the special 26 RU. In an aspect, the additional signaling may be an indication or an indication signal whose value is indicative of whether the special 26 RU is allocated and, thus, whether an extra presence of STA specific information subfield(s) associated with the allocation of the special 26 RU is contained in the SIG-B field. For instance, when the indication is set to a first value (e.g., 1), the special 26 RU is allocated. When the indication is set to a second value (e.g., 0), the special 26 RU is not allocated. In an aspect, such an indication may be contained in a center 26-tone RU subfield of the common information subfield of the SIG-B field.

In one or more aspects, the common information subfield may include the RU allocation subfield, the center 26-tone RU subfield, a cyclic redundancy check (CRC) subfield, and a tail subfield. In an aspect, the additional signaling for the special 26 RU may be between the RU allocation information (e.g., contained in the RU allocation subfield) in the common information subfield and station specific information. In an aspect, the additional signaling may be immediately after the RU allocation information. In an aspect, the additional signaling may be in both coding block 1 and 2. In an aspect, the additional signaling may include one bit. In an aspect, for an 80 MHz channel bandwidth, the additional signaling (e.g., 1 bit) may be included in both coding block 1 and 2 to indicate if the special 26 RU is allocated. In an aspect, for a full bandwidth of 80 MHz, add 1 bit to indicate if center 26-tone RU is allocated in the common block fields of both SIG-B content channels with same value. In other words, for an 80 MHz channel bandwidth, add 1 bit with the same value in the common block fields of both SIG-B content channels if the center 26-tone RU is allocated.

In an aspect, for a 160 MHz or 80+80 MHz channel bandwidth, the additional signaling (e.g., 1 bit) may be included in both coding block 1 and 2 to indicate if the special 26 RU of one of the 80 MHz bands is allocated. In an aspect, for a full bandwidth of 160 MHz or 80+80 MHz, add 1 bit to indicate if center 26-tone RU is allocated for one individual 80 MHz in the common block fields of both SIG-B content channels. In other words, for a 160 MHz or 80+80 MHz channel bandwidth, add 1 bit in the common block fields of both SIG-B content channels to indicate if the center 26-tone RU for one individual 80 MHz is allocated.

Figure 19A:
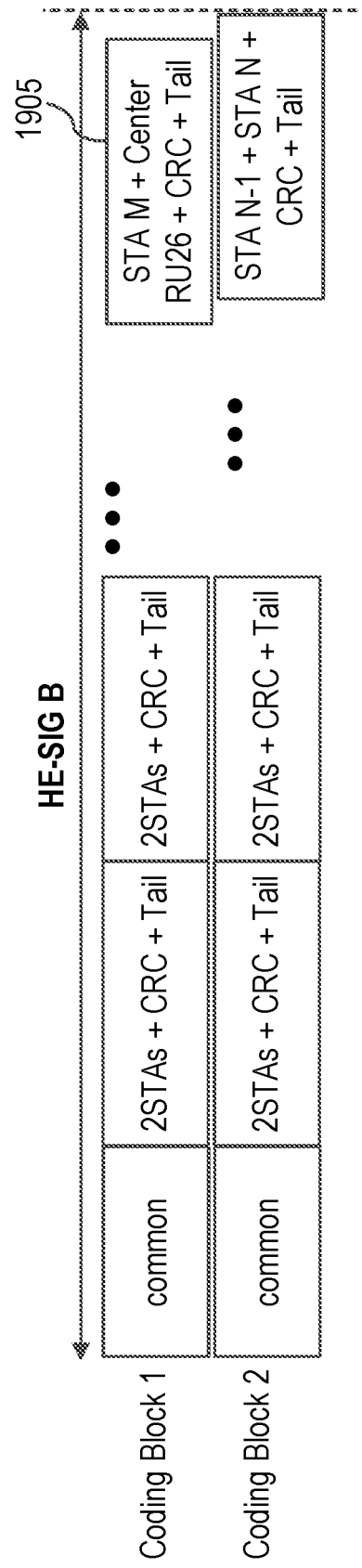
FIGS. 19A and 19B illustrate examples of an HE-SIG-B field.

FIG. 19A illustrates an example of an HE-SIG-B field. The BCC block is defined for every two consecutive STA specific information subfields (including the STA specific information subfield for the special 26 RU). In FIG. 19A, a BCC block 1905 includes STA specific information for STA M as well as for the special 26 RU. In this regard, the special 26 RU is included at an end of the STA specific information.

Additional signaling may also be conveyed in the SIG-B field (or in the SIG-A field) to indicate the extra presence of STA specific information subfield(s) other than those indicated by the RU allocation information in the common information subfield. In this regard, the additional signaling may indicate the presence of a STA specific information subfield associated with the special center 26 RU. In some cases, M may be odd and N may be even. For instance, in a case that the number of STA specific information subfield of FIG. 19A indicated by the common information subfield is odd, and one or more of the special 26 RU STA specific information exist, the STA specific information for the special 26 RU may be paired with STA specific information for other RUs within the BCC block 1905.

Figure 19B:
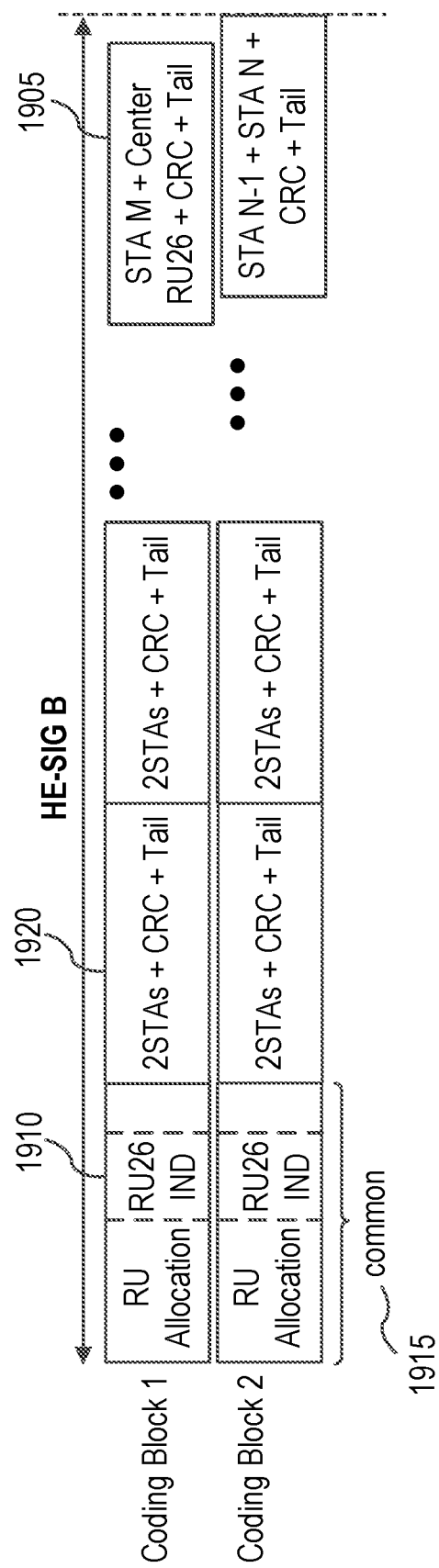

FIG. 19B illustrates an example of the HE-SIG-B field of FIG. 19A with an indication 1910 of the special center 26 RU explicitly depicted. The indication 1910 of the special center 26 RU is denoted as RU26 IND. In an aspect, the indication 1910 may be 1 bit. The indication 1910 may be between the RU allocation information in the common information subfield 1915 (e.g., a BCC block in which the common information subfield 1915 is encoded) and a first BCC block 1920 associated with station specific information. In an aspect, CRC bits and tail bits may follow the indication 1910 in the common information subfield 1915.

In some aspects, the STA specific information subfield for the special 26 RU may be defined as a separate BCC block. In an aspect, in a case when the number of STA specific information subfields indicated by the common information subfield is odd and the total number is M, only one STA specific information subfield exists for the BCC block that contains the $M^{th}$ STA specific information subfield. The STA specific information subfield(s) for the special 26 RU may form a new BCC block following the $M^{th}$ STA specific information subfield.

Figure 20:
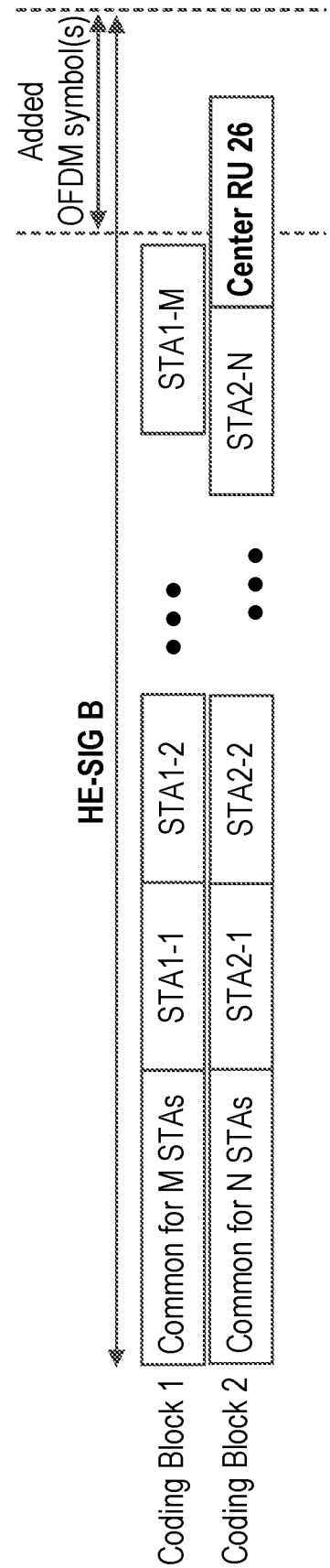
FIG. 20 illustrates an example of an HE-SIG-B field in which the special 26 resource unit may be mapped to a different orthogonal frequency division multiplexing (OFDM) symbol.

In some aspects, the STA specific information subfield(s) for the special 26 RU may be mapped on a different SIG-B OFDM symbol from the rest of the STA specific information subfield(s). In contrast, in some cases, the STA specific information subfield for the special 26 RU may be logically appended to the rest of the STA specific information subfield(s) and is not necessarily separated in different OFDM symbols. In this regard, FIG. 20 illustrates an example of an HE-SIG-B field in which the special 26 RU may be, but need not be, mapped to a different OFDM symbol. For instance, in FIG. 20, the special 26 RU subfield may fit in the SIG-B field without an added OFDM symbol if there is sufficient space after the STA2-N specific information subfield.

FIG. 21 illustrates an example of an HE-SIG-B field in which the special 26 RU is mapped to a different OFDM symbol. In such a case, after the STA specific information for RUs other than the special 26 RU, dummy information may be included as padding such that the common subfield, STA specific information subfield, and padding (e.g., padding bit(s)) fill an integer number of OFDM symbols. As shown in FIG. 21, the STA specific information subfield for the special 26 RU, denoted as Center RU26, is mapped to the next OFDM symbol (e.g., following a last STA specific information subfield in both coding block 1 and coding block 2). For coding block 1, padding may be present in the gap between STA1-M and Center RU26. For coding block 2, padding may be present in the gap between STA2-N and Center RU26. In an aspect, because the STA specific information subfield for the special 26 RU is transmitted in a separate OFDM symbol (e.g., in FIG. 21), it is possible to change the MCS for the OFDM symbol containing the STA specific information subfield for the special 26 RU.

In an aspect, compressed OFDM symbol duration can be applied to the OFDM symbols containing the STA specific information subfield for the special 26 RU. In an aspect, a compressed OFDM symbol duration may be denoted as 2× whereas a non-compressed OFDM symbol duration may be denoted as 4×. FIG. 22 illustrates an example of an HE-SIG-B field in which the special 26 RU is mapped to a compressed OFDM symbol. The description from FIG. 21 generally applies to FIG. 22, with examples of differences between FIG. 21 and FIG. 22 and other description provided herein for purposes of clarity and simplicity. The compressed OFDM symbol may potentially have a smaller DFT duration compared with other (e.g., non-compressed) SIG-B OFDM symbols. The compressed OFDM symbol shown in FIG. 22 may be half the size (e.g., half the number of bits) of the OFDM symbol of FIG. 21.

In one or more implementations, methods are provided for facilitating repetition in the frequency domain. In an aspect, the repetition may be referred to as a duplication. In some aspects, RU repetition in terms of the frequency domain may be utilized because soft combining of the received RUs may facilitate extension of communication range and improved performance (e.g., such as for outdoors). In some cases, without payload available for outdoor circumstances, the large range of L-SIG/HE-SIG-A in the preamble may be meaningless. In an aspect, the RU repetition may be referred to as RU duplication. In an aspect, a duplicated mode in OFDMA may be applied to any RU(s).

Figure 23:
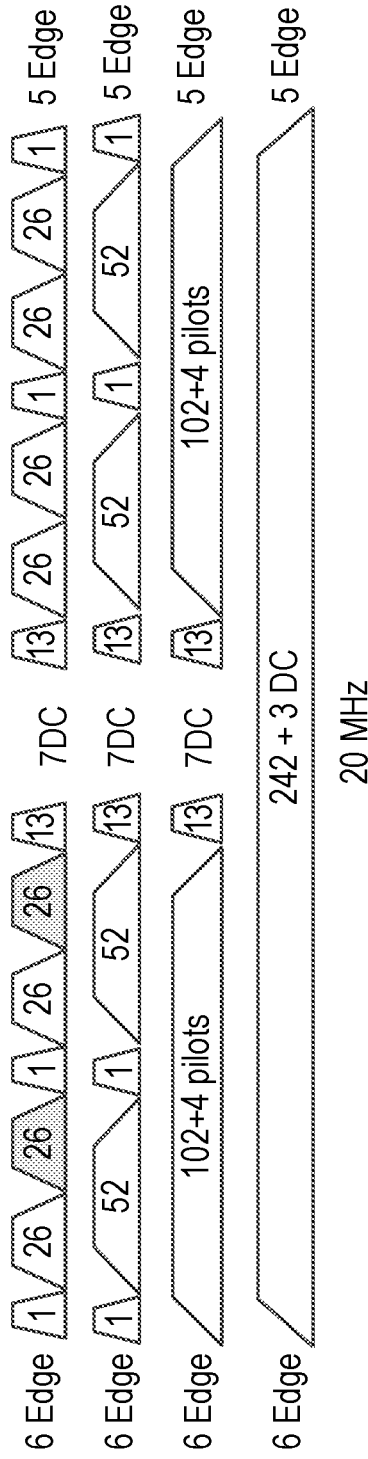
FIG. 23 illustrates an example in which two identical 26-tone resource units are paired.

In an aspect, a non-continuous RU that includes two duplicated half-tone RUs may be assigned for (e.g., allocated to) a STA in OFDMA. In a case with limited supported interleaver and tone mapper size, a WLAN device may or may not be able to decode the non-continuous RU (e.g., depending on the size of the non-continuous RU). For example, if the interleaver and tone mapper are designed for only the same number of tones to RUs, assigning the non-continuous RU for the station may only allow for assigning of a non-continuous 52-tone RU that includes two 26-tone RUs as shown in FIG. 23. In an aspect, any two non-continuous 26-tone RUs could be paired with identical content (e.g., HE-DATA) in any operating bandwidth channels. For instance, in FIG. 23, the two 26-tone RUs with gray shading may be paired. In an aspect, the duplication of the same content in multiple RUs may facilitate decoding of the content by the receiver.

Figure 24:
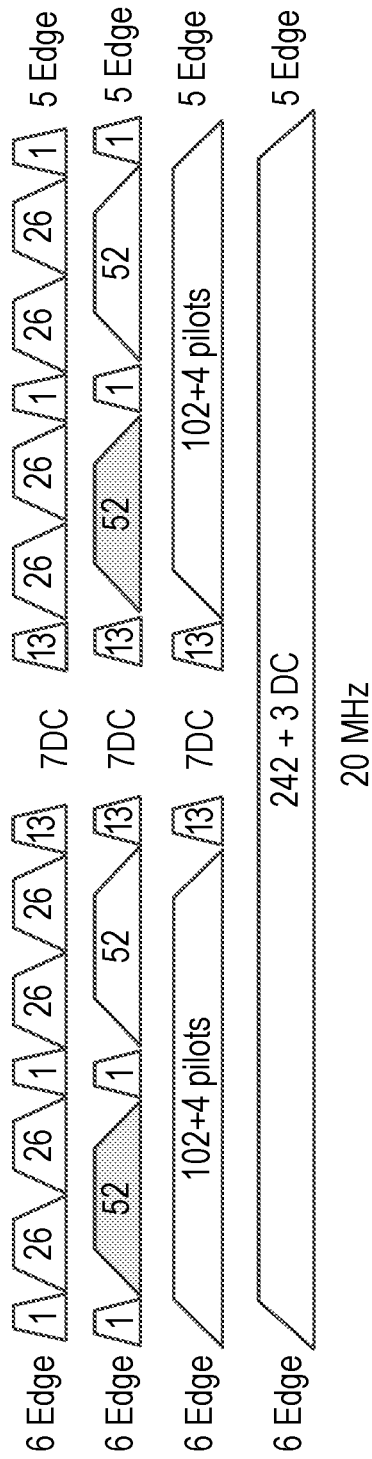
FIG. 24 illustrates an example in which two identical 52-tone resource units are paired.

In an aspect, a continuous or non-continuous RU including two (or more) duplicated RUs may be assigned for STAs using RUs in OFDMA numerology. In this regard, any size of RU may be allowed. For example, FIG. 24 illustrates an example in which two identical 52-tone RUs (shaded in gray) are paired.

In an aspect, the RU repetition may be applied to a trigger frame, including a trigger frame that allocates RU for random access, when robust coverage for communication links is desired. A trigger frame that allocates RU for random access may be referred to as trigger frame-R. It is noted that the trigger frame sent by the AP is utilized to indicate that UL MU PPDUs are to be sent as an immediate response to trigger frame.

Figure 25A:
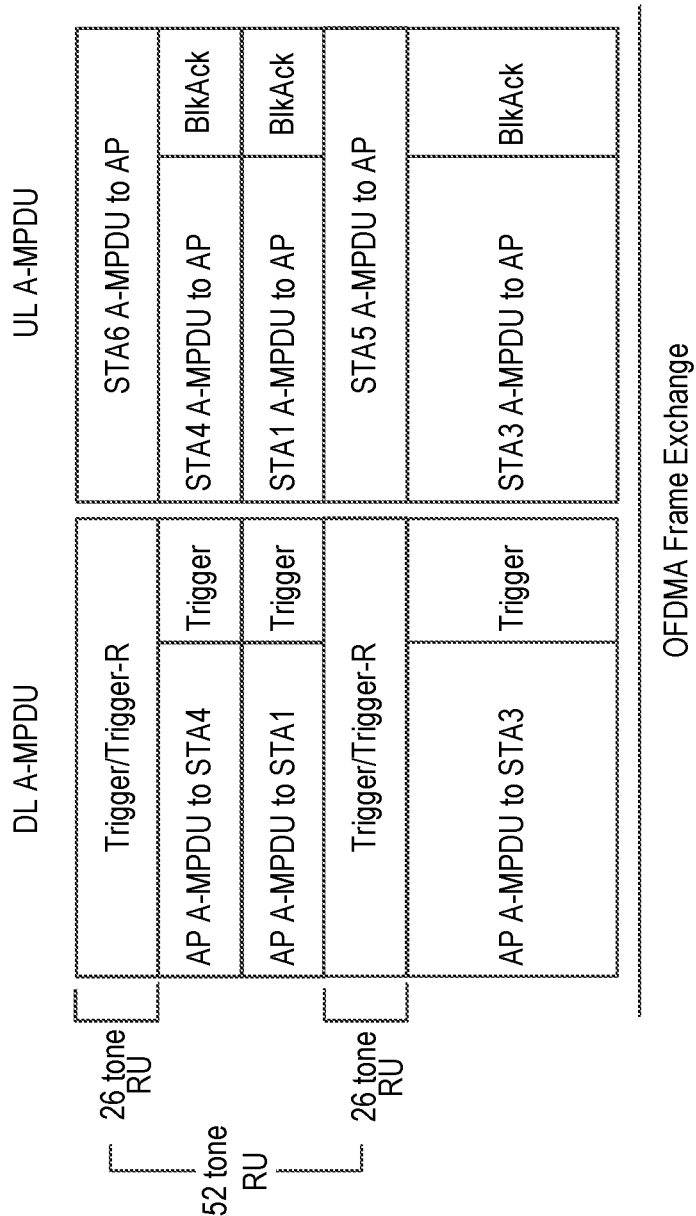
FIG. 25A illustrates an example in a non-continuous RU that includes two duplicated half-tone resource units may be assigned for a station in orthogonal frequency division multiple access (OFDMA).
Figure 25B:
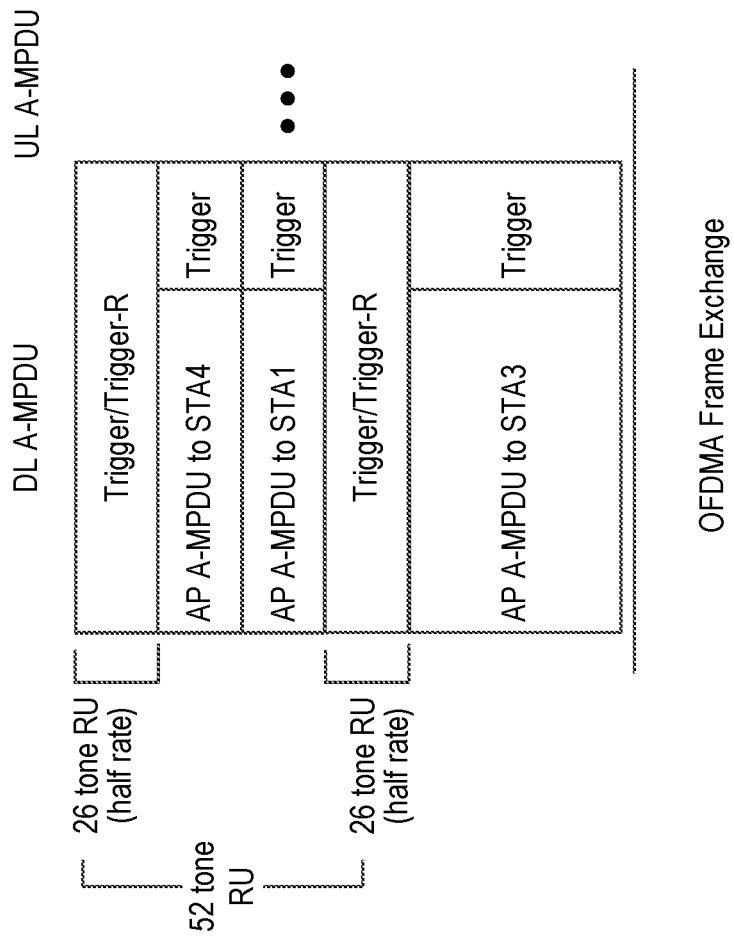
FIG. 25B illustrates an example in a non-continuous RU that includes two duplicated resource units may be assigned for a station in OFDMA.

In a case where the trigger frame may be in a PPDU that is to be transmitted to multiple (and/or random) STAs, securing enough coverage may be helpful. FIG. 25A illustrates an example in which a non-continuous RU that includes two duplicated half-tone RUs (such as shown in FIG. 23) may be assigned for (e.g., allocated to) a STA in OFDMA. FIG. 25B illustrates an example in which a non-continuous RU that includes two duplicated RUs (such as shown in FIG. 24) may be assigned for (e.g., allocated to) a STA in OFDMA.

In an aspect, the RU repetition may be applied to a beacon frame, which may be duplicated on every 20 MHz or through part of an operating channel bandwidth. A beacon bit indicating duplicated mode may be in the HE information element.

Repeated RUs position could be indicated one by one, which may increase signaling overhead. For multi-user OFDMA transmission, the signaling of the multi-RU signal transmission (described above) can be conveyed either in the common information or user specific information of SIG-B.

In one or more aspects, options are provided for including control information indication associated with repeated RUs.

Option A) Duplicated RUs paired with even (or odd) indices within an entire/part of an operating bandwidth or assigned resource for random access.

Option B) A first RU position in terms of frequency index and one more subfield indicating equal distance between paired RUs. They are within an entire/part of an operating bandwidth or assigned resource for random access.

In an aspect, since the transmission that utilizes repetition in frequency can be used to improve reception reliability of signals, such transmission may be utilized in the extended range PPDU format, an example of which is shown in FIG. 7. In an aspect, the transmission would still utilize the RUs defined for the OFDMA numerology, examples of which are shown in FIGS. 8A, 8B, and 8C.

Figure 26:
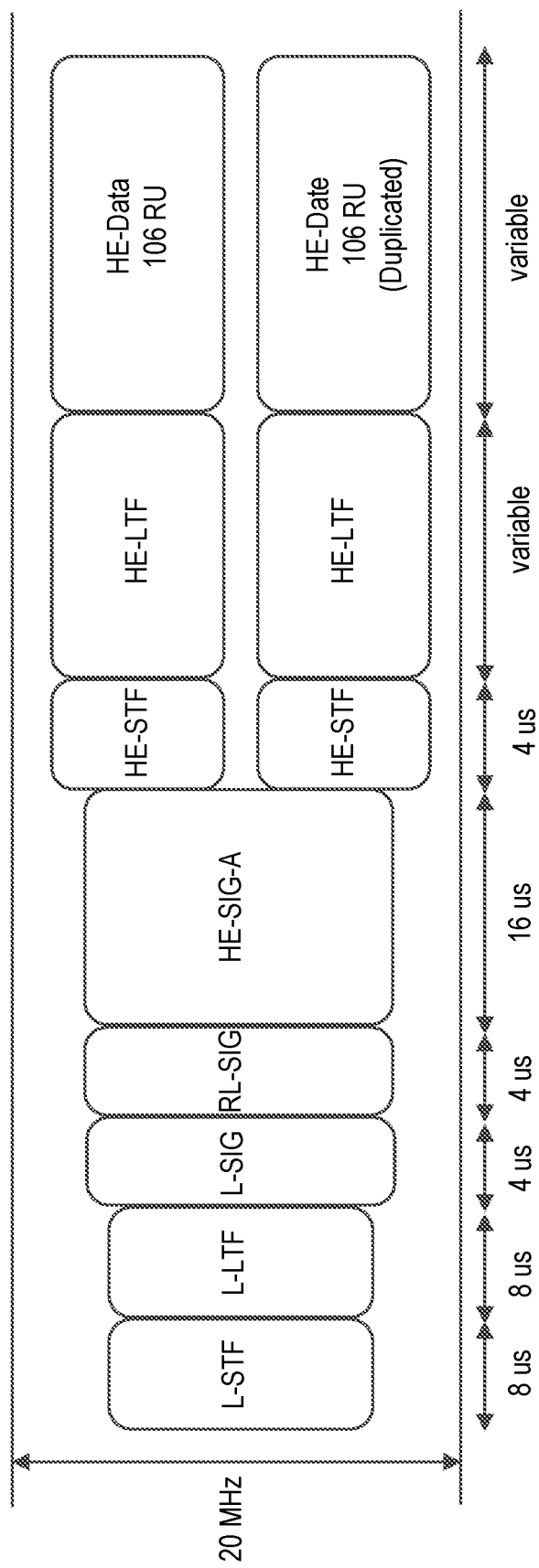
FIG. 26 illustrates an example of a transmitted physical layer convergence procedure (PLCP) protocol data unit (PPDU) signal structure.

For example, two 106 RUs may be used in extended range PPDU format. The two 106 RUs can carry identical data information. FIG. 26 illustrates an example of a transmitted PPDU signal structure. The x-axis (horizontal) represents the time domain and the y-axis (vertical) represents the frequency domain. The lower frequency 106 RU is a duplicate of (e.g., contains the same data as) the upper frequency 106 RU.

Figure 27:
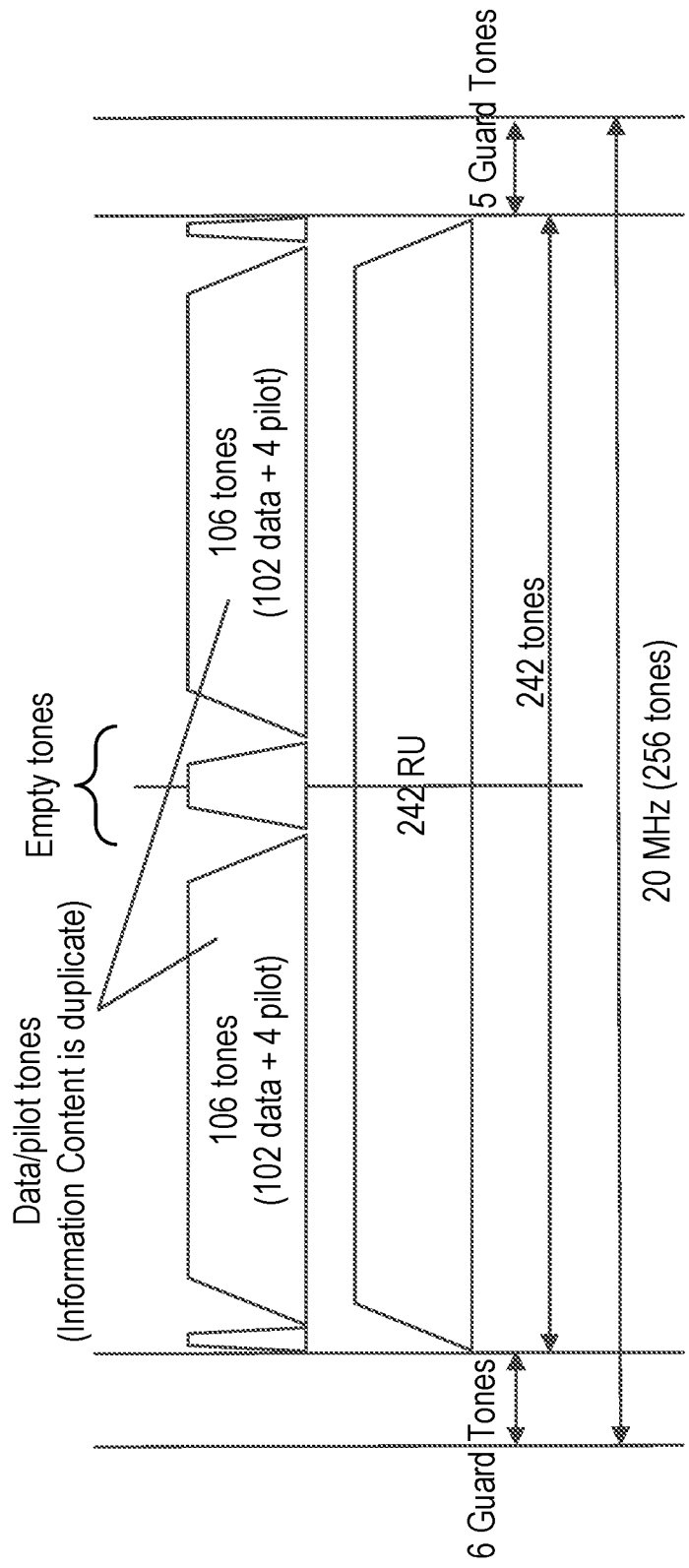
FIG. 27 illustrates an example of a frequency domain representation of a data field portion of a PPDU for the example of repeated 106 resource unit transmission in 20 MHz PPDU.

FIG. 27 illustrates an example of a frequency domain representation of a data field (e.g., HE-DATA field) portion of a PPDU for the example of repeated 106 RU transmission in 20 MHz PPDU. In an aspect, the two 106 RUs are from the OFDMA numerology for the 20 MHz transmission. The empty tones in FIG. 26 may include the 26 tones and 7 DC tones between the two 106 RUs, which are not used for the extended range PPDU. In an aspect, in FIG. 26, since the 20 MHz numerology includes only two 106 tones, the repeating of the information content in the two 106 tones need not be indicated. In an aspect, when the extended range PPDU is transmitted, the extended range PPDU is being transmitted such that the content in the two 106 tones are identical.

Figure 28:
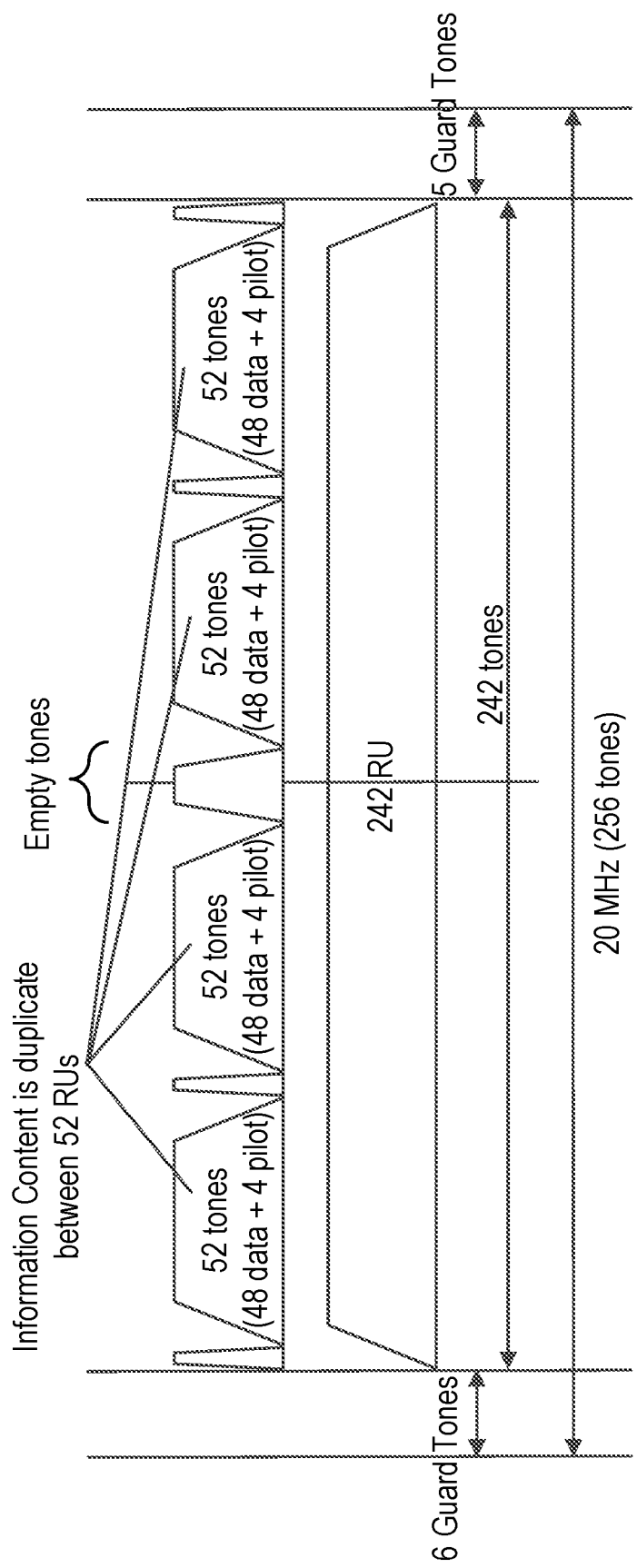
FIGS. 28, 29, and 30 illustrate examples of a frequency domain representation of a data field portion of a PPDU for the example of repeated 52 resource unit transmission in 20 MHz PPDU.

FIG. 28 illustrates an example of a frequency domain representation of a data field (e.g., HE-DATA field) portion of a PPDU for the example of repeated 52 RU transmission in 20 MHz PPDU. In FIG. 28, four 52 RUs are used for repeated signal transmission. Each of the 52 RU contains identical data information content. The duplicated information (e.g., HE-DATA field) is sent in each of the four 52 RU positioning using the OFDMA numerology for 20 MHz.

Figure 29:
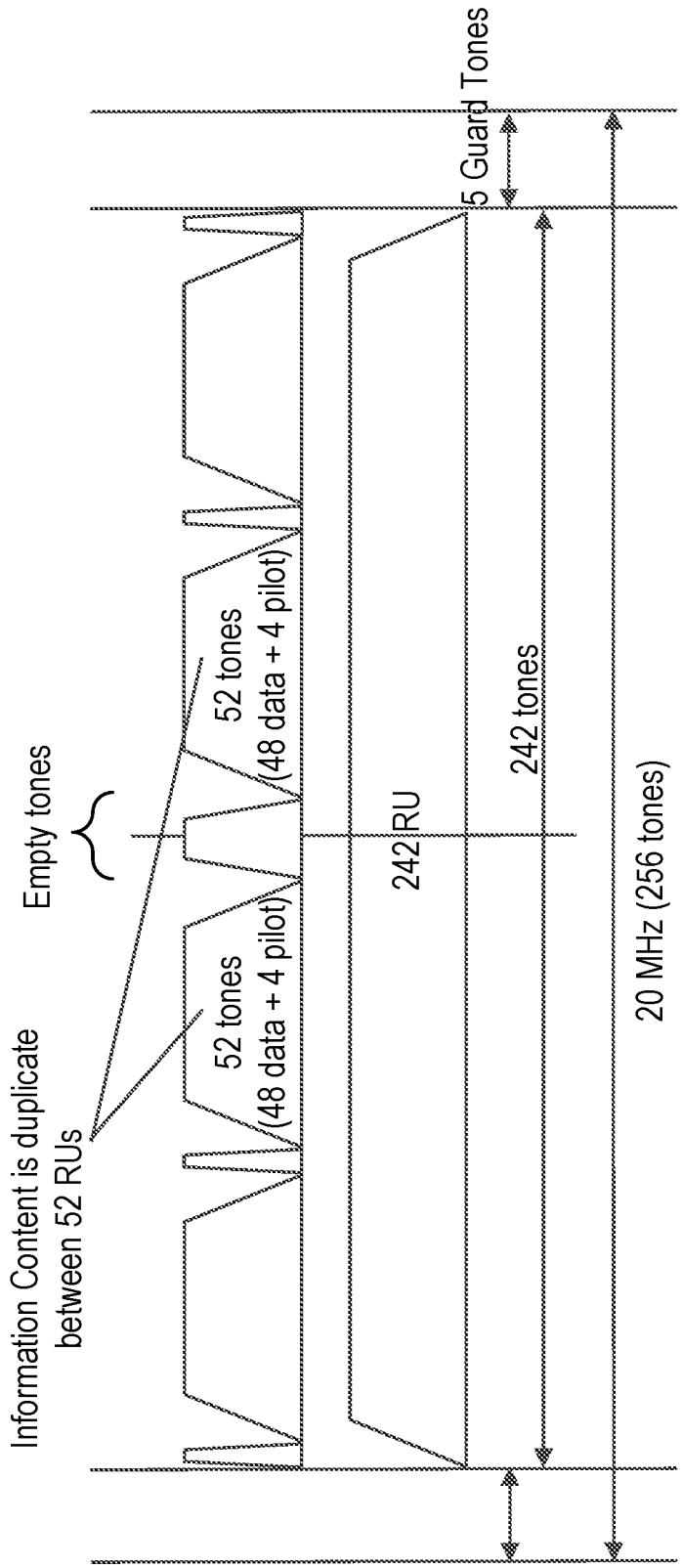
Figure 30:
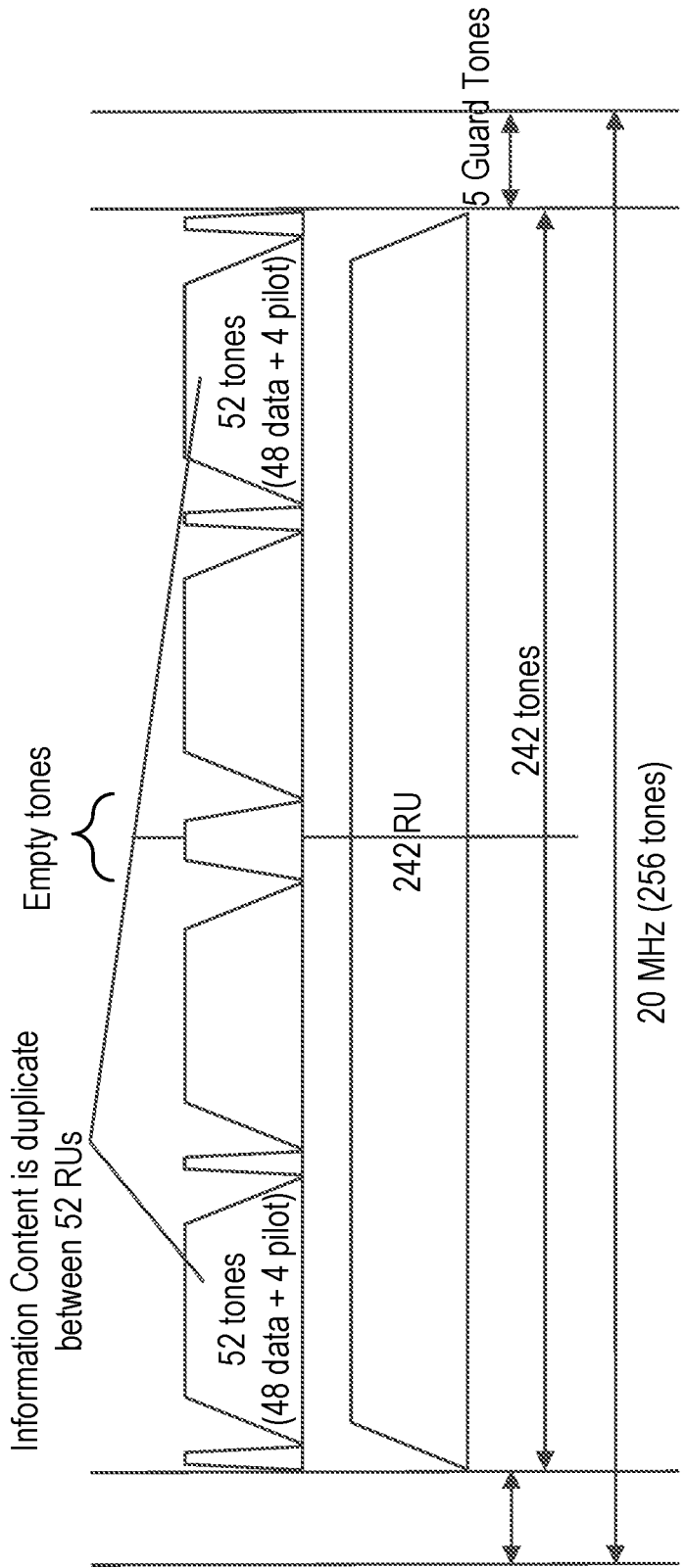

FIGS. 29 and 30 illustrate examples of a frequency domain representation of a data field (e.g., HE-DATA field) portion of a PPDU for the example of repeated 52 RU transmission in 20 MHz PPDU. Two 52 RU are used for repeated signal transmission. Each of the 52 RU contains identical data information content. The duplicated information is sent in each of the two 52 RU positioning using the OFDMA numerology for 20 MHz. The difference between the examples in FIGS. 29 and 30 are whether signals are transmitted in the inner two 52 RUs or outer 52 RUs of the 20 MHz channel bandwidth. In an aspect, using the inner two 52 RUs may have the benefit of having less interference from adjacent 20 MHz channels.

In one aspect, information that is identically duplicated in the frequency domain may cause higher peak to average power ratio (PAPR). Signals resulting in higher PAPR may likely be transmitted using a lower transmit power, such that signal clipping and non-linear signal distortion does not occur. In an aspect, in order to avoid high PAPR, it may be possible to scramble (e.g., multiply) the duplicated signals with a different scramble sequence.

For example, in FIG. 27, the lower frequency 106 RU is regularly sent (e.g., without modification), while the upper frequency 106 RU may be scrambled with a scrambling sequence in each OFDM symbol. Even if the two 106 RU contain the same content (e.g., content is repeated/duplicated), the scrambling of the upper 106 RU may mitigate (e.g., reduce) high PAPR of the transmission signal.

Figure 31:
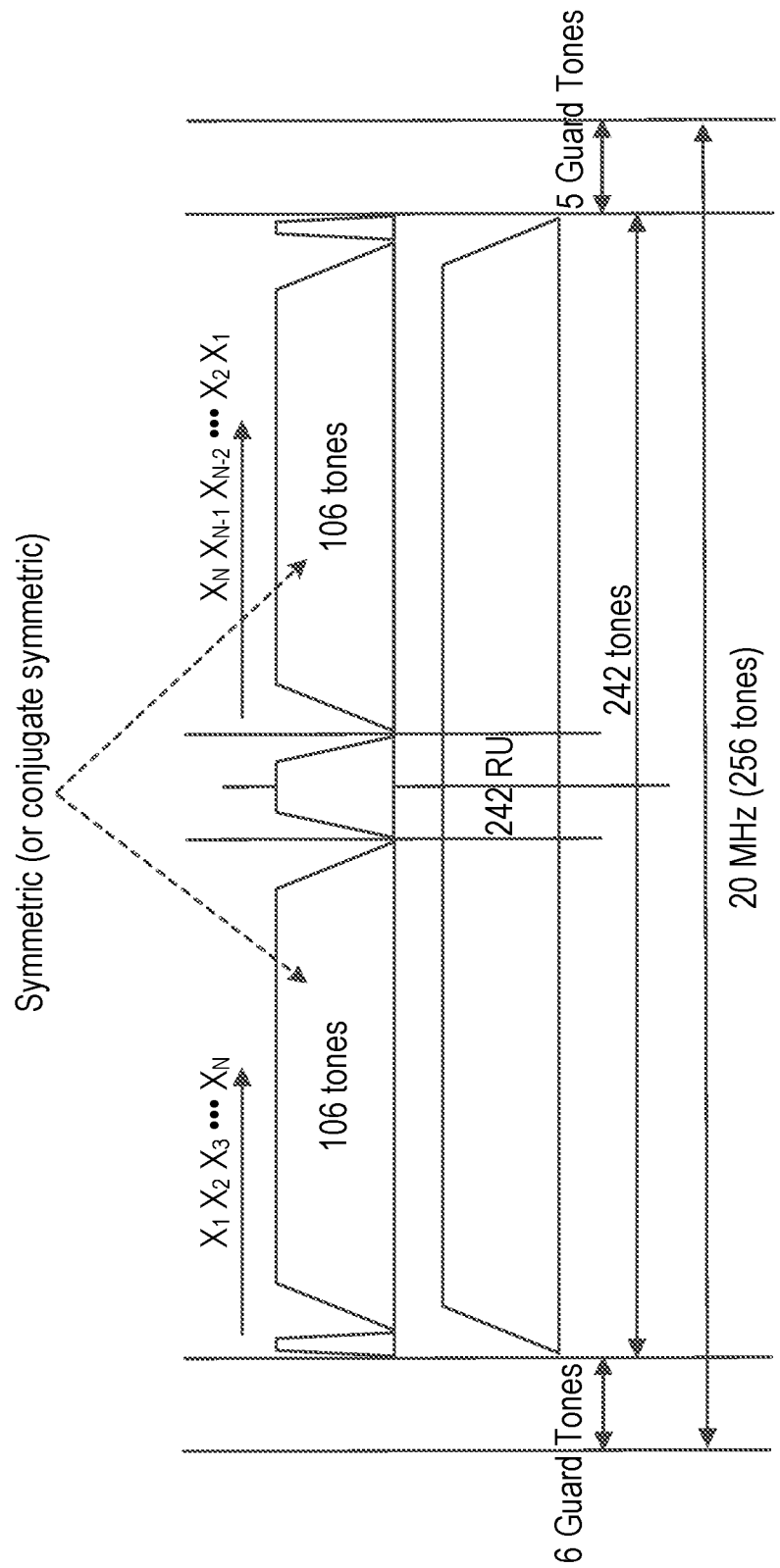
FIG. 31 illustrates an example of a symmetric mapping of signals.

In another aspect, to reduce high PAPR, symmetric mapping of signals may be utilized. FIG. 31 illustrates an example of a symmetric mapping of signals. The repeated signals can be mirror symmetric (or conjugate mirror symmetric) mapping of data modulated tones (e.g., binary phase-shift keying (BPSK) or quadrature phase-shift keying (QPSK) modulated symbols) with respect to a center DC tone. In some cases, a combination of mirror symmetric signals and scrambling may be utilized to reduce high PAPR.

In an aspect, in case of dual carrier modulated (DCM) signals, information content can be duplicated even within a RU (either 106-, 52-, or 26-RU). The repetition for robust transmission may be applied on top of the DCM. This may effectively result in four times repeated signals for two 106 RU (or two 52 RU) transmission.

It should be noted that like reference numerals may designate like elements. These components with the same reference numerals have certain characteristics that are the same, but as different figures illustrate different examples, the same reference numeral does not indicate that a component with the same reference numeral has the exact same characteristics. While the same reference numerals are used for certain components, examples of differences with respect to a component are described throughout this disclosure.

The embodiments provided herein have been described with reference to a wireless LAN system; however, it should be understood that these solutions are also applicable to other network environments, such as cellular telecommunication networks, wired networks, etc.

An embodiment of the present disclosure may be an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations may be performed by specific hardware components that contain hardwired logic (e.g., dedicated digital filter blocks and state machines). Those operations may alternatively be performed by any combination of programmed data processing components and fixed hardwired circuit components.

In some cases, an embodiment of the present disclosure may be an apparatus (e.g., an AP STA, a non-AP STA, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

Figure 32A:
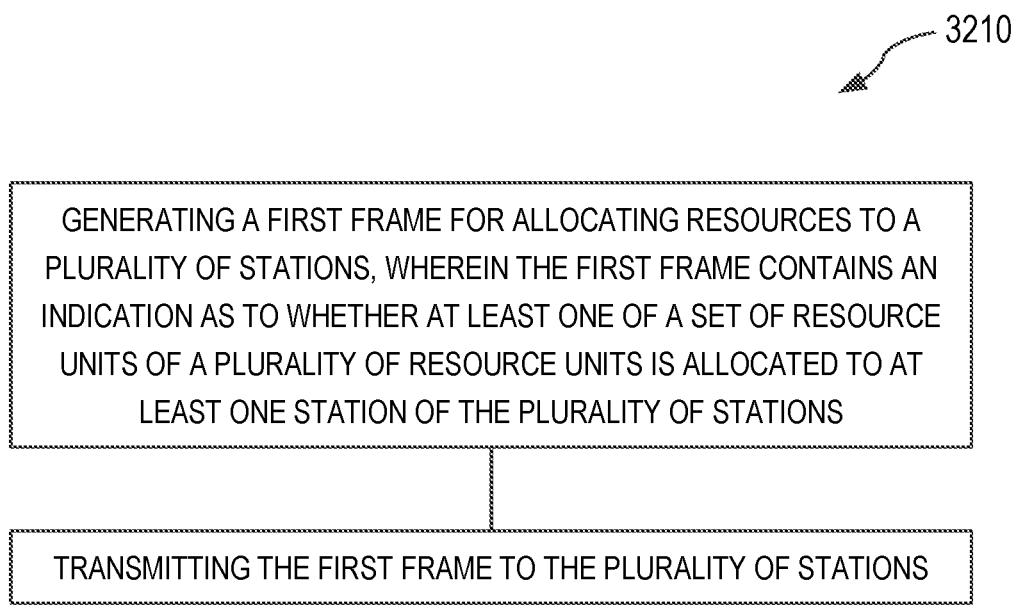
FIGS. 32A, 32B, and 32C illustrate flow charts of examples of methods for facilitating wireless communication for uplink transmission.
Figure 32B:
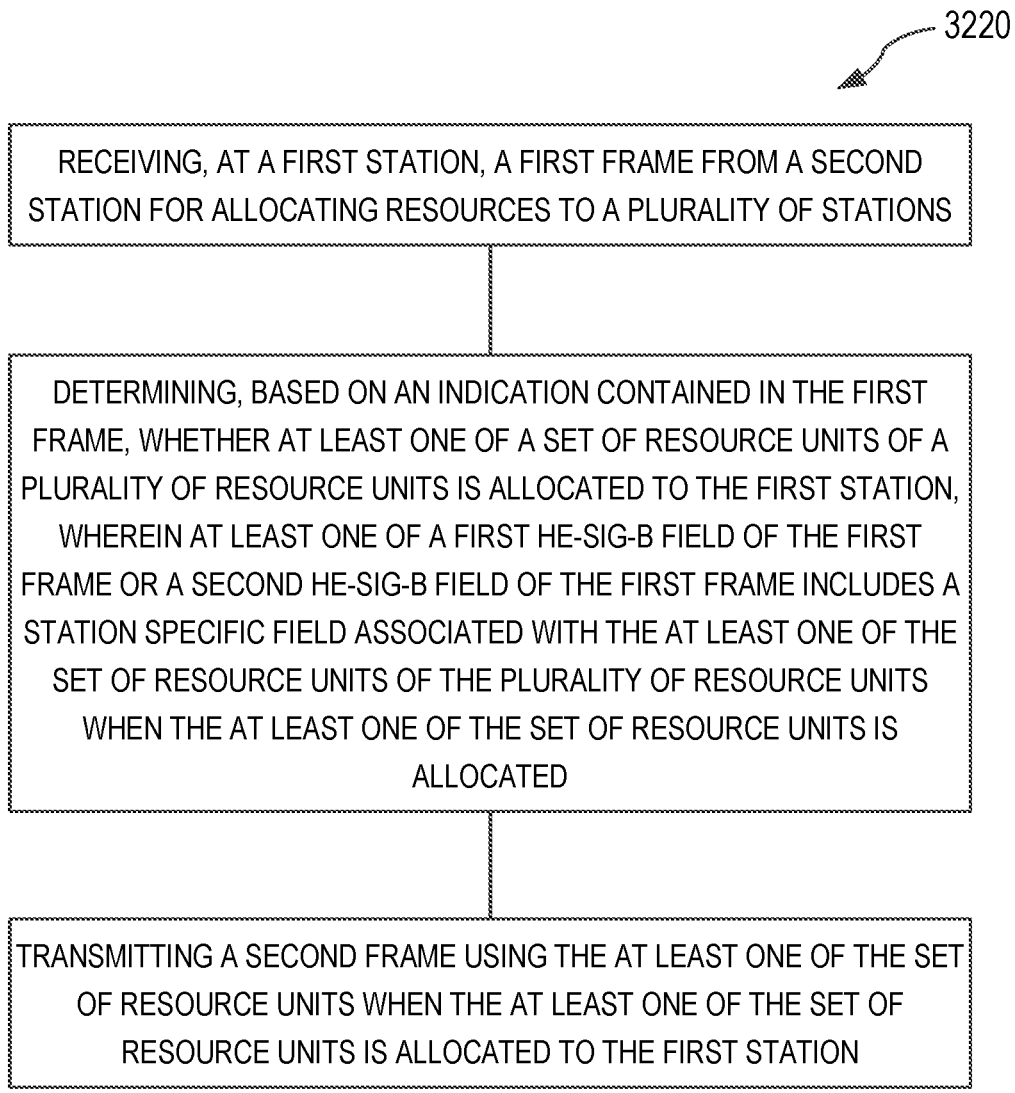
Figure 32C:
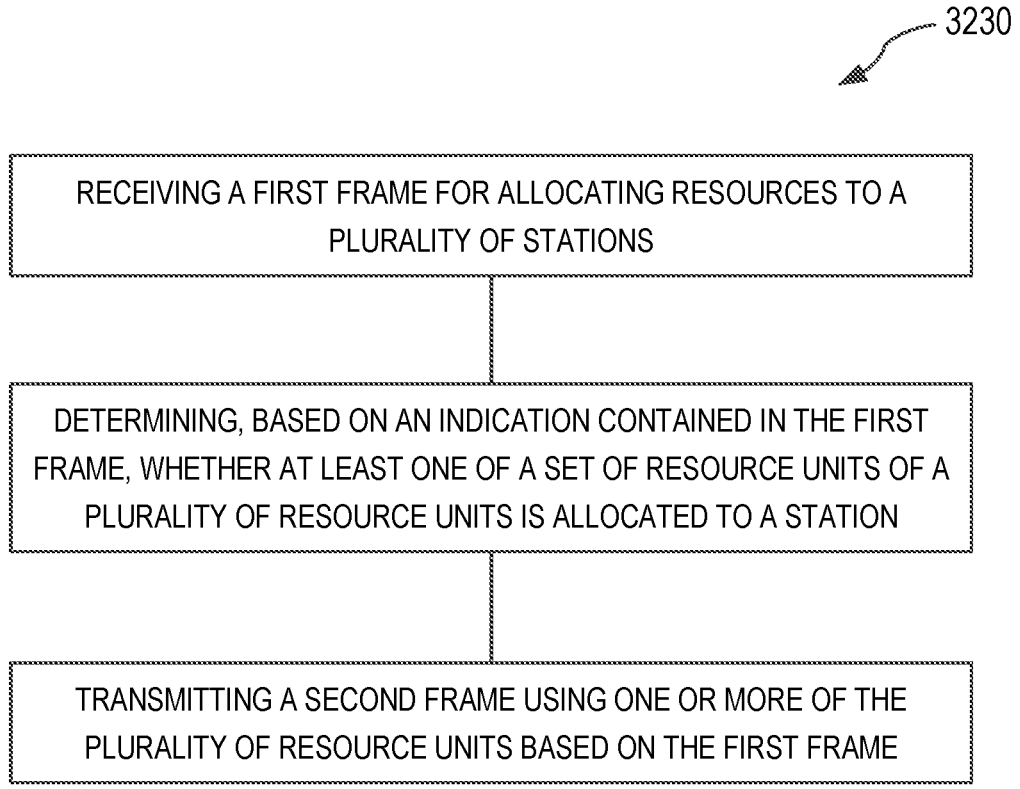

FIGS. 32A, 32B, and 32C illustrate flow charts of examples of methods for facilitating wireless communication. For explanatory and illustration purposes, the example processes 3210, 3220, and 3230 may be performed by the wireless communication devices 111-115 of FIG. 1 and their components such as a baseband processor 210, a MAC processor 211, a MAC software processing unit 212, a MAC hardware processing unit 213, a PHY processor 215, a transmitting signal processing unit 280 and/or a receiving signal processing unit 290; however, the example processes 3210, 3220, and 3230 are not limited to the wireless communication devices 111-115 of FIG. 1 or their components, and the example processes 3210, 3220, 3230 may be performed by some of the devices shown in FIG. 1, or other devices or components. Further for explanatory and illustration purposes, the blocks of the example processes 3210, 3220, 3230 are described herein as occurring in serial or linearly. However, multiple blocks of the example processes 3210, 3220, 3230 may occur in parallel. In addition, the blocks of the example processes 3210, 3220, 3230 need not be performed in the order shown and/or one or more of the blocks/actions of the example processes 3210, 3220, 3230 need not be performed.

Various examples of aspects of the disclosure are described below as clauses for convenience. These are provided as examples, and do not limit the subject technology. As an example, some of the clauses described below are illustrated in FIGS. 32A, 32B, and 32C.

Clause A. An access point for facilitating communication in a wireless network for a multi-user transmission, the access point comprising: one or more memories; and one or more processors coupled to the one or more memories, the one or more processors configured to cause: generating a first frame for allocating resources to a plurality of stations, wherein the first frame contains an indication as to whether at least one of a set of resource units of a plurality of resource units is allocated to at least one station of the plurality of stations; and transmitting the first frame to the plurality of stations for the multi-user transmission, wherein the multi-user transmission is associated with a first channel bandwidth or a second channel bandwidth, wherein a size of the second channel bandwidth is different from a size of the first channel bandwidth, and wherein the at least one of the set of resource units consists of a resource unit, two of a plurality of tones of the resource unit being separated by a plurality of direct current (DC) tones.

Clause B. A computer-implemented method of facilitating communication in a wireless network for a multi-user transmission, the computer-implemented method comprising: receiving, at a first station, a first frame from a second station for allocating resources to a plurality of stations; determining, based on an indication contained in the first frame, whether at least one of a set of resource units of a plurality of resource units is allocated to the first station, wherein at least one of a first HE-SIG-B field of the first frame or a second HE-SIG-B field of the first frame comprises a station specific subfield associated with the at least one of the set of resource units of the plurality of resource units when the at least one of the set of resource units is allocated; and transmitting, for the multi-user transmission, a second frame using the at least one of the set of resource units to the plurality of stations when the at least one of the set of resource units is allocated to the first station, wherein: the first HE-SIG-B field is associated with a first portion of a channel bandwidth, and the second HE-SIG-B field is associated with a second portion of the channel bandwidth, the channel bandwidth is associated with a first bandwidth size or a second bandwidth size, wherein the second bandwidth size is different from the first bandwidth size, and the at least one of the set of resource units consists of a resource unit, two of a plurality of tones of the resource unit being separated by a plurality of direct current (DC) tones.

Clause C. A station for facilitating communication in a wireless network for a multi-user transmission, the station comprising: one or more memories; and one or more processors coupled to the one or more memories, the one or more processors configured to cause: receiving a first frame for allocating resources to a plurality of stations; determining, based on an indication contained in the first frame, whether at least one of a set of resource units of a plurality of resource units is allocated to the station; and transmitting, for the multi-user transmission, a second frame using one or more of the plurality of resource units based on the first frame, wherein the multi-user transmission is associated with a first channel bandwidth or a second channel bandwidth, wherein a size of the second channel bandwidth is different from a size of the first channel bandwidth, and wherein the at least one of the set of resource units consists of a resource unit, two of a plurality of tones of the resource unit being separated by a plurality of direct current (DC) tones.

In one or more aspects, additional clauses are described below.

A method comprising one or more methods or operations described herein.

An apparatus or a station comprising one or more memories (e.g., 240, one or more internal, external or remote memories, or one or more registers) and one or more processors (e.g., 210) coupled to the one or more memories, the one or more processors configured to cause the apparatus to perform one or more methods or operations described herein.

An apparatus or a station comprising one or more memories (e.g., 240, one or more internal, external or remote memories, or one or more registers) and one or more processors (e.g., 210 or one or more portions), wherein the one or more memories store instructions that, when executed by the one or more processors, cause the one or more processors to perform one or more methods or operations described herein.

An apparatus or a station comprising means (e.g., 210) adapted for performing one or more methods or operations described herein.

A computer-readable storage medium (e.g., 240, one or more internal, external or remote memories, or one or more registers) comprising instructions stored therein, the instructions comprising code for performing one or more methods or operations described herein.

A computer-readable storage medium (e.g., 240, one or more internal, external or remote memories, or one or more registers) storing instructions that, when executed by one or more processors (e.g., 210 or one or more portions), cause the one or more processors to perform one or more methods or operations described herein.

In one aspect, a method may be an operation, an instruction, or a function and vice versa. In one aspect, a clause may be amended to include some or all of the words (e.g., instructions, operations, functions, or components) recited in other one or more clauses, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An access point for facilitating communication in a wireless network for a transmission, the access point comprising:
   one or more memories; and
   one or more processors coupled to the one or more memories, the one or more processors configured to cause:
   generating a frame for transmission to a set of stations, wherein each station in the set of stations is allocated a resource unit from a channel bandwidth of the frame, wherein the frame comprises a high efficiency signal-B (HE-SIG-B) field arranged in a plurality of content channels occupying respective subbands of the channel bandwidth of the frame,
wherein a first content channel of the plurality of content channels of the HE-SIG-B field contains (1) a first common information field that includes (A) resource unit allocation information to allocate a first set of resource units of the channel bandwidth to a first set of one or more stations in the set of stations and (B) when the channel bandwidth of the frame satisfies a predetermined bandwidth size, a first indication as to whether a second set of resource units are allocated to a station in the set of stations and (2) a first set of station specific information fields that include station specific information for the first set of one or more stations,
wherein a second content channel of the plurality of content channels of the HE-SIG-B field contains (1) a second common information field that includes (A) resource unit allocation information to allocate a third set of resource units of the channel bandwidth to a second set of one or more stations in the set of stations and (B) when the channel bandwidth of the frame satisfies the predetermined bandwidth size, a second indication as to whether the second set of resource units are allocated to a station in the set of stations, wherein the first indication has a same value as the second indication, and (2) a second set of station specific information fields that include station specific information for the second set of one or more stations, and
wherein station specific information associated with the second set of resource units is located between a last station specific information field of the first set of station specific information fields and the end of the first content channel of the HE-SIG-B field, and
transmitting the frame to the plurality of stations for the transmission, including the first content channel and the second content channel of the HE-SIG-B field.

2. The access point of claim 1, wherein the second set of resource units includes a resource unit that includes a first set of tones and a second set of tones, and
wherein a number of tones in the first set of tones is identical to a number of tones in the second set of tones.

3. The access point of claim 2, wherein the resource unit in the second set of resource units is at a center of the channel bandwidth of the frame.

4. The access point of claim 2, wherein the first set of tones includes thirteen tones and the second set of tones includes thirteen tones such that the second set of resource units includes twenty-six tones.

5. The access point of claim 2, wherein the first set of tone is separated from the second set of tones by a set of seven direct current tones.

6. The access point of claim 1, wherein the predetermined bandwidth size is 80 MHz such that one or more of the first indication is present in the first content channel of the HE-SIG-B field or the second indication is present in the second content channel of the HE-SIG-B field when the channel bandwidth of the frame is 80 MHz or greater, including when the channel bandwidth of the frame is 80+80 MHz.

7. The access point of claim 6, wherein the channel bandwidth includes two copies of the first content channel of the HE-SIG-B field and two copies of the second content channel of the HE-SIG-B field when the channel bandwidth is 80 MHz.

8. The access point of claim 1, wherein the first content channel of the HE-SIG-B field and the second content channel of the HE-SIG-B field are each duplicated in the channel bandwidth such that one or more of the first indication and the second indication is duplicated in the channel bandwidth.

9. The access point of claim 1, wherein the first common information field indicates the number of stations from the set of stations allocated to the first set of resource units and the second common information field indicates the number of stations from the set of stations allocated to the second set of resource units.

10. The access point of claim 1, wherein the resource unit allocation information that allocates the first set of resource units of the channel bandwidth to the first set of one or more stations in the set of stations includes resource allocation information for the second set of resource units when the first indication indicates that the second set of resource units are allocated to the station in the set of stations.

11. A station for facilitating communication in a wireless network for a transmission, the station comprising:
one or more memories; and
one or more processors coupled to the one or more memories, the one or more processors configured to cause:
receiving a downlink frame for allocating resources to a set of stations, wherein each station in the set of stations is allocated a resource unit from a channel bandwidth of the downlink frame, wherein the downlink frame comprises a high efficiency signal-B (HE-SIG-B) field arranged in a plurality of content channels occupying respective subbands of the channel bandwidth of the downlink frame,
wherein a first content channel of the plurality of content channels of the HE-SIG-B field contains (1) a first common information field that includes (A) resource unit allocation information to allocate a first set of resource units of the channel bandwidth to a first set of one or more stations in the set of stations and (B) when the channel bandwidth of the downlink frame satisfies a predetermined bandwidth size, a first indication as to whether a second set of resource units are allocated to a station in the set of stations and (2) a first set of station specific information fields that include station specific information for the first set of one or more stations,
wherein a second content channel of the plurality of content channels of the HE-SIG-B field contains (1) a second common information field that includes (A) resource unit allocation information to allocate a third set of resource units of the channel bandwidth to a second set of one or more stations in the set of stations and (B) when the channel bandwidth of the downlink frame satisfies the predetermined bandwidth size, a second indication as to whether the second set of resource units are allocated to a station in the set of stations, wherein the first indication has a same value as the second indication, and (2) a second set of station specific information fields that include station specific information for the second set of one or more stations, and wherein station specific information associated with the second set of resource units is located between a last station specific information field of the first set of station specific information fields and the end of the first content channel of the HE-SIG-B field, processing one or more of the first common information field, the second common information field, the first set of station specific information fields, and the second set of station specific information fields to determine resource unit assignment for the station in the downlink frame.

12. The station of claim 11, wherein the second set of resource units includes a resource unit that includes a first set of tones and a second set of tones, and wherein a number of tones in the first set of tones is identical to a number of tones in the second set of tones.

13. The station of claim 12, wherein the resource unit in the second set of resource units is at a center of the channel bandwidth of the frame.

14. The station of claim 12, wherein the first set of tones includes thirteen tones and the second set of tones includes thirteen tones such that the second set of resource units includes twenty-six tones.

15. The station of claim 12, wherein the first set of tones is separated from the second set of tones by a set of seven direct current tones.

16. The station of claim 11, wherein the predetermined bandwidth size is 80 MHz such that one or more of the first indication is present in the first content channel of the HE-SIG-B field or the second indication is present in the second content channel of the HE-SIG-B field when the channel bandwidth of the frame is 80 MHz or greater, including when the channel bandwidth of the frame is 80+80 MHz.

17. The station of claim 16, wherein the channel bandwidth includes two copies of the first content channel of the HE-SIG-B field and two copies of the second content channel of the HE-SIG-B field when the channel bandwidth is 80 MHz.

18. The station of claim 11, wherein the first content channel of the HE-SIG-B field and the second content channel of the HE-SIG-B field are each duplicated in the channel bandwidth such that one or more of the first indication and the second indication is duplicated in the channel bandwidth.

19. The station of claim 11, wherein the first common information field indicates the number of stations from the set of stations allocated to the first set of resource units and the second common information field indicates the number of stations from the set of stations allocated to the second set of resource units.

20. The station of claim 11, wherein the resource unit allocation information that allocates the first set of resource units of the channel bandwidth to the first set of one or more stations in the set of stations includes resource allocation information for the second set of resource units when the first indication indicates that the second set of resource units are allocated to the station in the set of stations.

* * * * *